United States Patent [19]

Howard et al.

[11] 3,823,397

[45] July 9, 1974

[54] SERIAL TO PARALLEL CONVERTER FOR BINARY SIGNALS OF TWO DIFFERENT PULSE WIDTHS

[75] Inventors: Robert Howard, Roslyn, N.Y.; Prentice I. Robinson, Hudson; Herbert E. Menhennett, Windham, both of N.H.

[73] Assignee: Centronics Data Computer Corporation, Hudson, N.H.

[22] Filed: July 14, 1972

[21] Appl. No.: 271,817

Related U.S. Application Data

[62] Division of Ser. No. 35,405, May 7, 1970.

[52] U.S. Cl. ...... 340/347 DD, 178/26 A, 178/23 R, 235/92 SH

[51] Int. Cl. ............................................. G06f 5/04

[58] Field of Search .......... 340/347 DD, 172.5, 154, 340/174.1 H; 235/154, 92 SH; 178/69.5 R, 26 A, 23 R; 179/15 A; 325/320, 321

[56] References Cited

UNITED STATES PATENTS

| | | | |
|---|---|---|---|
| 3,160,876 | 12/1964 | Stochel | 340/347 DD |
| 3,201,759 | 8/1965 | Kelly | 340/172.5 |
| 3,310,626 | 3/1967 | Cassidy, Jr. | 340/347 DD X |
| 3,313,922 | 4/1967 | Magnin | 340/347 DD X |
| 3,395,400 | 7/1968 | DeWitt et al. | 340/172.5 |
| 3,416,133 | 12/1968 | Hunkins et al. | 235/92 SH |
| 3,508,228 | 4/1970 | Bishop | 340/174.1 H |
| 3,546,592 | 12/1970 | Mayo | 178/69.5 R |

*Primary Examiner*—Charles D. Miller
*Attorney, Agent, or Firm*—Ostrolenk, Faber, Gerb & Soffen

[57] ABSTRACT

A high-speed printer of the dot matrix type in which incoming information to be printed, presented in either serial or parallel form, is examined for invalid bits and loaded into a buffer in parallel fashion. Printing does not begin until the buffer is loaded to print a line of the desired length. Printing begins as soon as the first character loaded into the buffer reaches the output stage at which time the actuation of the print wires of the dot matrix are moved across the paper document at a substantially constant speed. Detection of the location of the carriage assembly moving the printer head assembly is performed independent of the movement of the carriage to actuate the print wires at the appropriate locations. Logical circuitry is provided for detecting the presence of invalid characters and the buffer and serial-to-parallel converter are cleared prior to the loading of the next group of characters to be printed on the next line of print. During serial transmission, the printer assembly generates Acknowledge signals to indicate to the transmitting facility that the previous character has been received and stored.

6 Claims, 24 Drawing Figures

SERIAL TO PARALLEL CONVERTER FOR BINARY SIGNALS OF TWO DIFFERENT PULSE WIDTHS

This is a division of application Ser. No. 35,405, filed May 7, 1970.

The present invention relates to printers and more particularly to a line printer of the dot matrix type for performing a high-speed page printing.

Wire matrix printers are well known in the prior art. One of the earlies types of wire matrix printers is comprised of a plurality of wires arranged in matrix fashion for making impact through a ribbon to a paper document whereby the wires are selectively energized to form characters, numerals and other symbols. The earliest type of wire matrix printers were capable of printing either words or entire characters. The next development in the art consisted of wire matrix printers having a plurality of wires arranged in an M-row by N-column fashion. A typical arrangement for such wire matrix printers are to provide a total of 35 wires arranged in seven rows and five columns to print any character, number, or symbol. In operation, selected ones of the print wires are driven against the paper document to form the desired character or symbol. The print wires are then shifted one position to the right to print the next character whereby shifting occurs in an intermittent fashion. Since 35 separate mechanisms must be provided for each of the 35 print wires forming the 5 × 7 matrix, the amount of mass which must be moved to perform such printing is quite appreciable. This thereby resulted in the development of wire matrix type printers in which only seven print wires are employed. The print wires are typically arranged in a vertical line and are selectively driven against the paper document to form one of the seven columns of the character. The carriage assembly which moves the print wire assembly is then shifted one position to the right to print the next column. This operation continues until all five columns have been printed to ultimately form the character or other symbol.

The present invention is characterized by providing a high speed impact printer of the dot matrix type in which the printer head assembly is constantly moved across the paper document at speeds not heretofore capable of being achieved in present day systems.

The present invention is comprised of a carriage assembly which supports a printer head assembly having solenoid driven print wires. The entire printer head assembly, including the solenoid drivers, is moved across the paper document at a constant rate of speed. The arrangement of the printer head assembly is such as to provide a light weight compact structure so as to minimize the mass which is moved across the paper document, enabling the structure to move at relatively high speed.

The carriage assembly is driven at a substantially constant rate of speed which is independent of the printing operation. The location of the carriage assembly is detected by a position readout device which generates a pulse as the carriage assembly moves into the next printing position regardless of the speed at which the carriage assembly is being moved.

A buffer is provided for storing all the characters to be printed upon a single line, which buffer is fully loaded before printing begins. Since the buffer is purely an electronic solid state device, the printing speed is limited only by the mechanism structure and not by the buffer. Each character is examined for validity before insertion into the buffer to prevent the loading of invalid characters. As soon as the buffer is either fully loaded or loaded to the extent called for by the transmitting facility, the printing operation is initiated. The printing operation continues until an end of line signal is detected, at which time the buffer is automatically cleared, a "dummy" character is loaded into the buffer and the carriage assembly is returned to its lefthandmost position in readiness for the next line of print. The bit lengths of each character are detected for validity by a control counter. The state of each bit is determined by the duration in which the first portion of the bit interval is at a first level. A timing counter is provided to examine the state of each binary bit comprising a character within a 20 microseconds interval to substantially reduce the effect of any spurious signal upon the accuracy of the bit being received. This arrangement provides a printer having a capability of printing more than 165 characters per second, for accepting serial information at a rate of better than 3,000 bits per second and is capable of accepting up to 80,000 characters per second in the parallel transmission mode providing an extremely high speed printer which is further capable of providing multiple original copies from the single printing operation.

It is, therefor, one object of the present invention to provide a novel high speed impact printer of the dot matrix type in which the printing operation is independent of the speed of movement of the print carriage.

Still another object of the present invention is to provide a novel high speed impact printer of the dot matrix type in which the print head assembly is moved at a constant rate of speed and printing is controlled by electronically detecting the position of the printer head assembly.

Still another object of the present invention is to provide a novel high speed impact printer of the dot matrix type in which characters of each line of print are loaded into a buffer before initiation of the print operation in order to permit the print mode to be performed at a high rate of speed.

Still another object of the present invention is to provide a novel high speed impact printer of the dot matrix type in which characters of each line of print are loaded into a buffer before initiation of the print operation in order to permit the print mode to be performed at a high rate of speed and wherein characters are examined for validity before insertion into the buffer to prevent the loading of invalid characters.

Still another object of the present invention is to provide a novel high speed impact printer of the dot matrix type in which characters of each line of print are loaded into a buffer before initiation of the print operation in order to permit the print mode to be performed at a high rate of speed and wherein characters are examined for validity before insertion into the buffer to prevent the loading of invalid characters and wherein the buffer is automatically clear and loaded with a dummy character prior to the receipt of the next group of characters to be printed as the next line of print.

These as well as other objects of the present invention will become apparent when reading the accompanying description and drawings in which.

Figure 5:
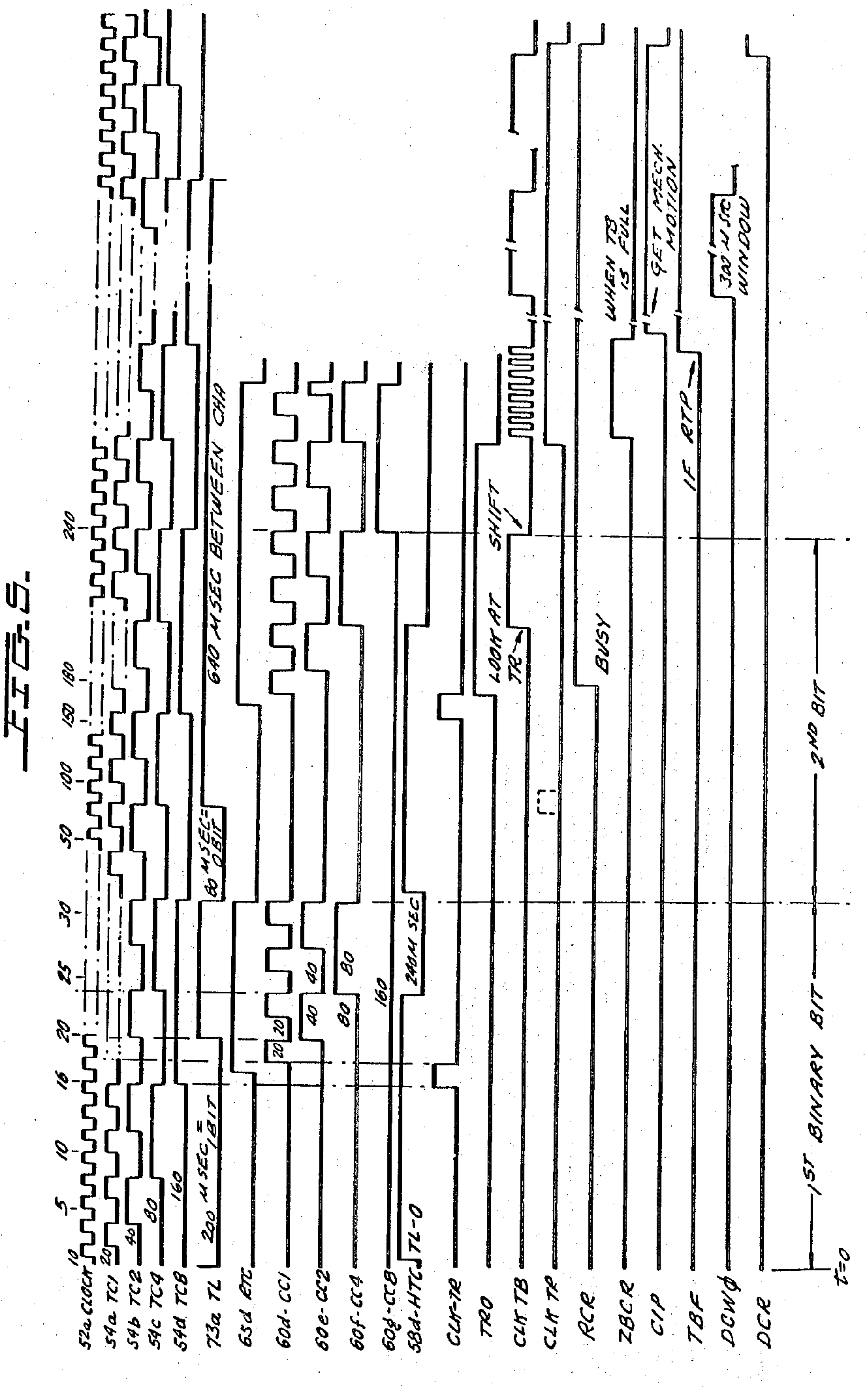
Figures 5A, 5B:
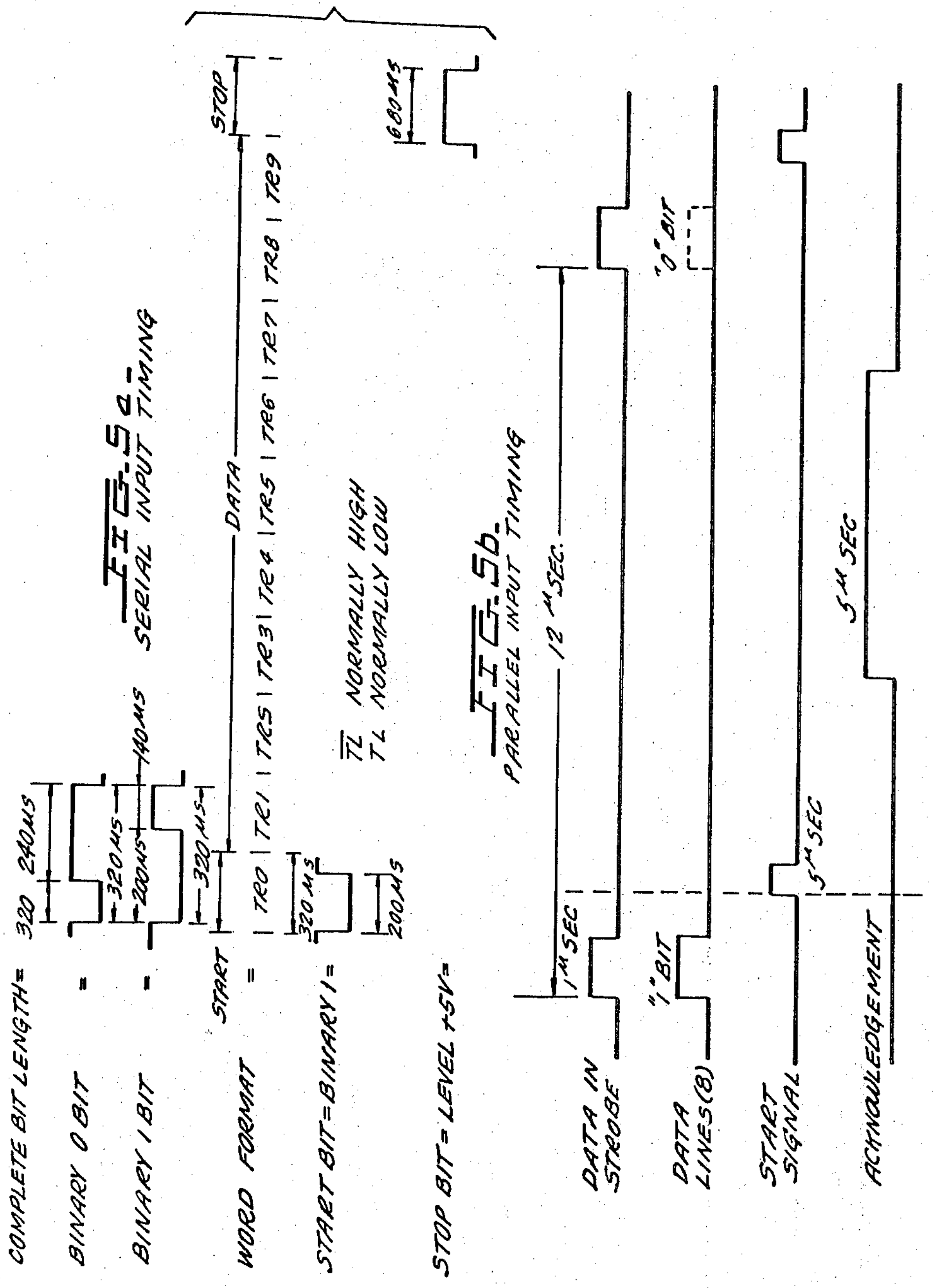

FIGS. 5–5*b* are timing diagrams showing various waveforms developed by the circuitry of the present invention, which waveforms are useful in understanding the operation of the present invention.

Figure 1:
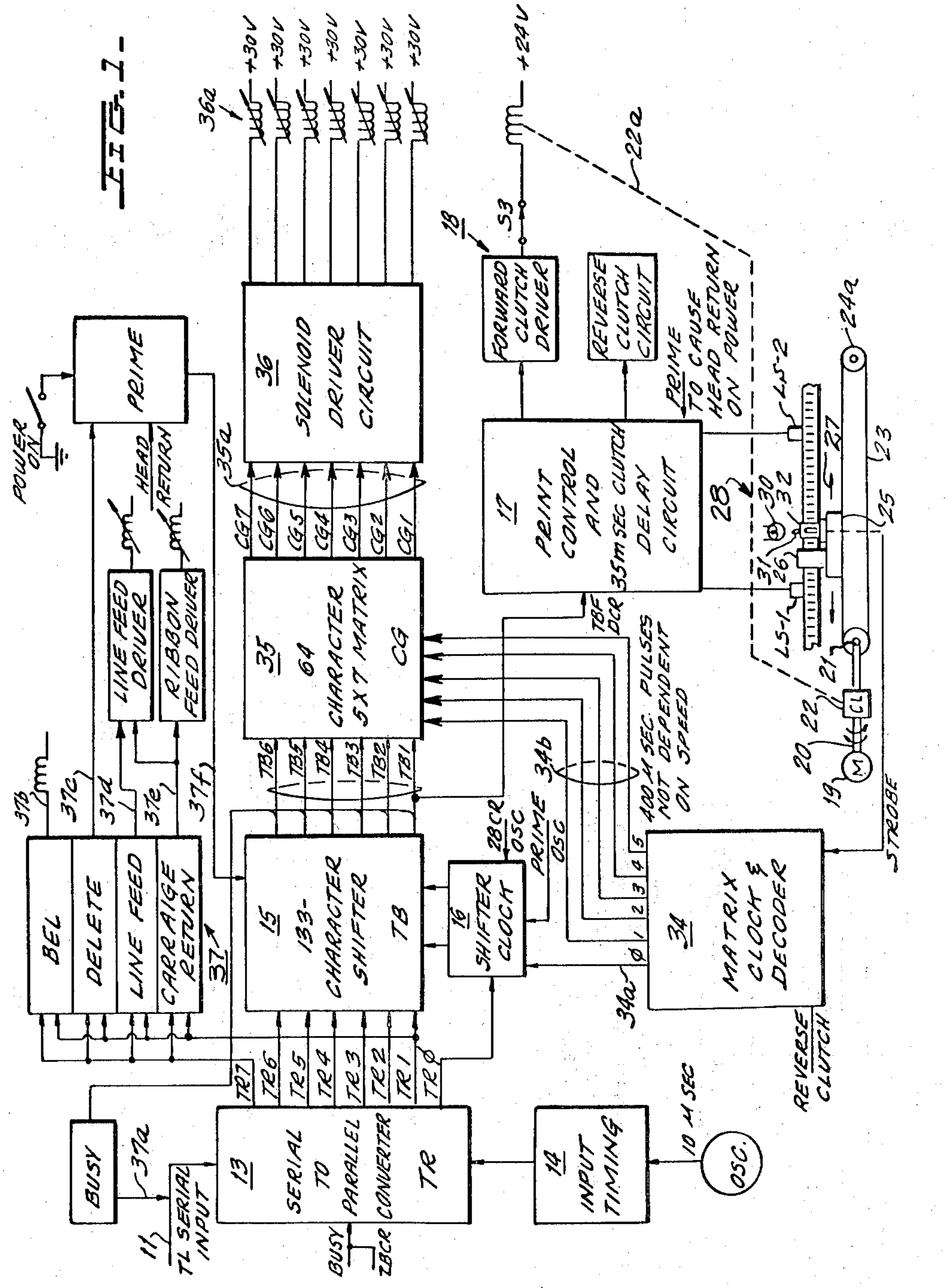
FIG. 1 shows a block diagram of a printer system incorporating the principles of the present invention.
Figure 6:
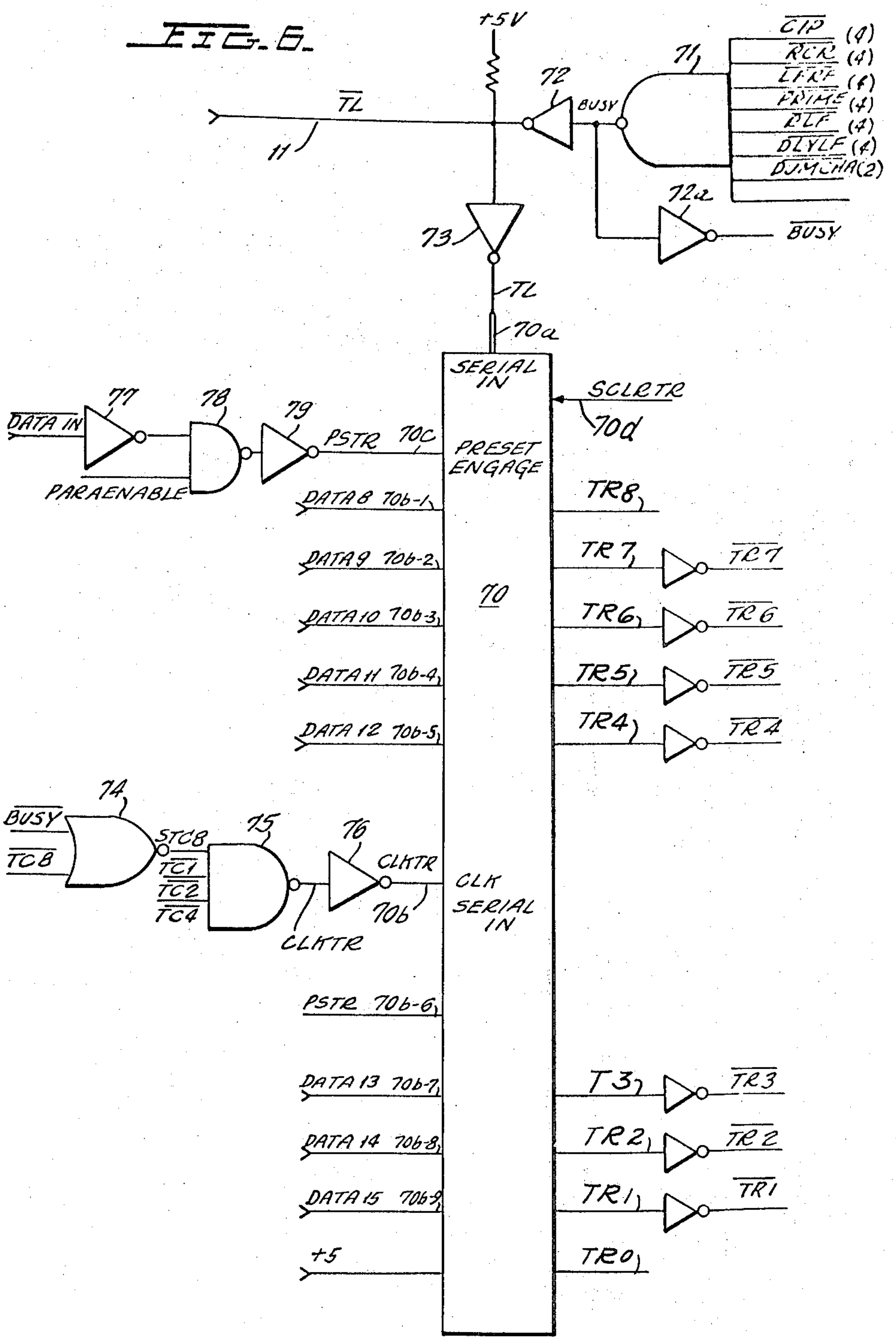

FIG. 6 is a logical diagram showing the serial-to-parallel input converter employed in the system of FIG. 1 in greater detail.

FIGS. 7*a*–7*c* and 8*a*–8*f* are logical diagrams showing the error detection and decoding circuitry respectively, employed to control some of the operating functions of the system of FIG. 1. FIGS. 9*a*–9*c* are logical diagrams showing the decoding circuitry employed for controlling mechanical functions of the system of FIG. 1.

Figure 10A:
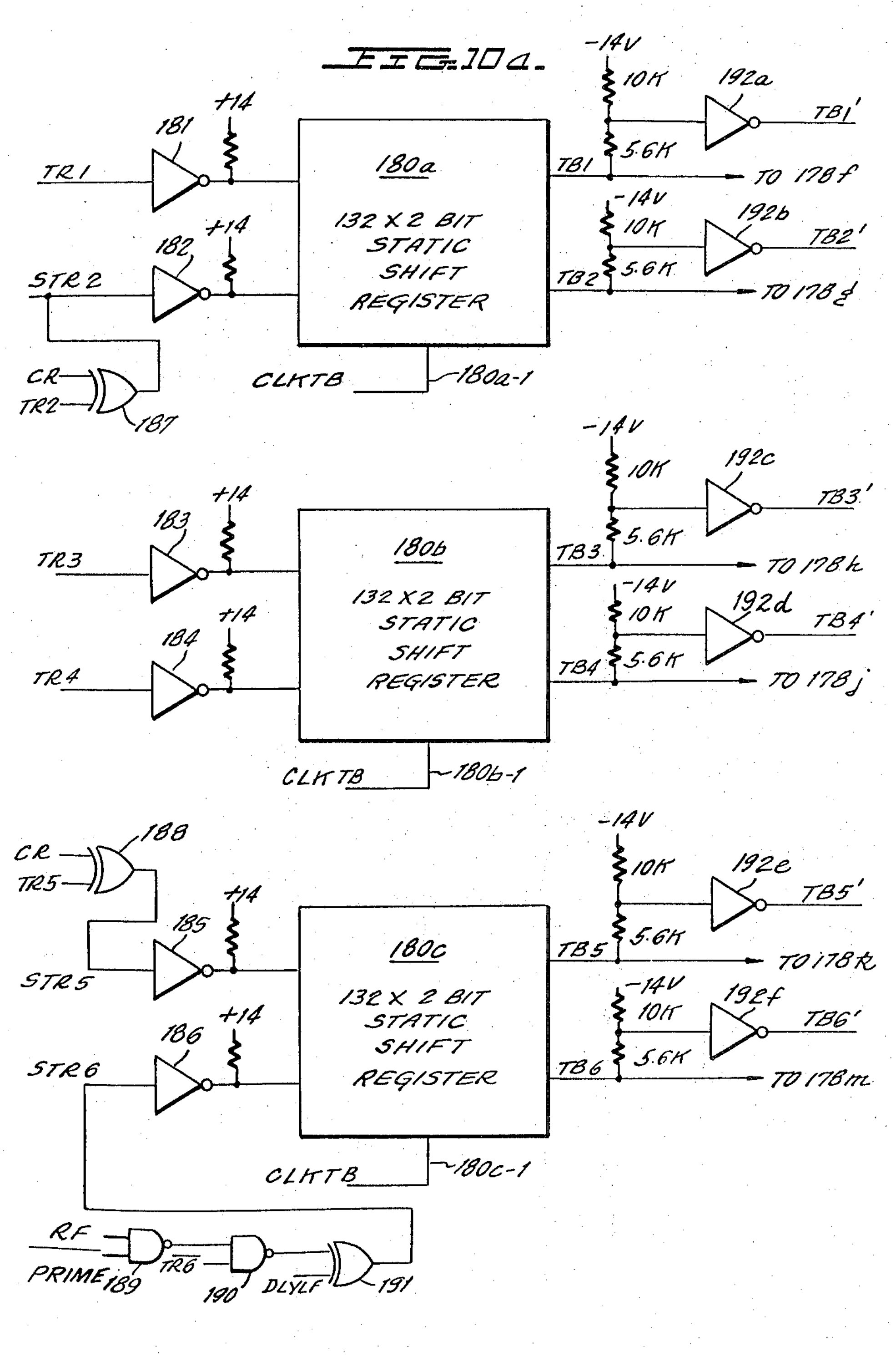
Figure 10B:
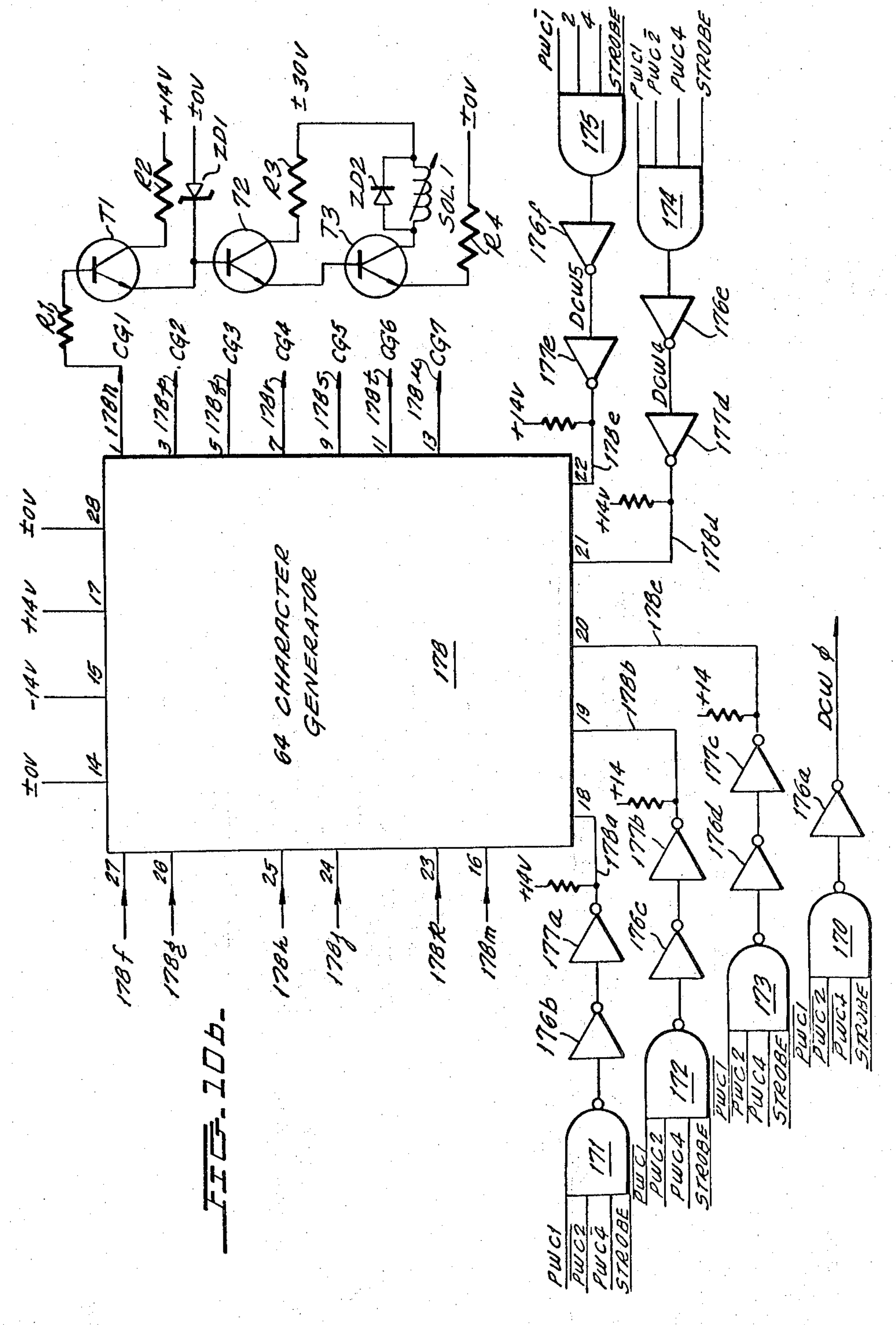

FIGS. 10*a* and 10*b* are logical diagrams showing the buffer and the position locating decoding circuitry and character generator matrix of FIG. 1 in greater detail.

FIG. 11 shows the position detecting apparatus of FIG. 1 in greater detail.

Figures 2, 3, 4:
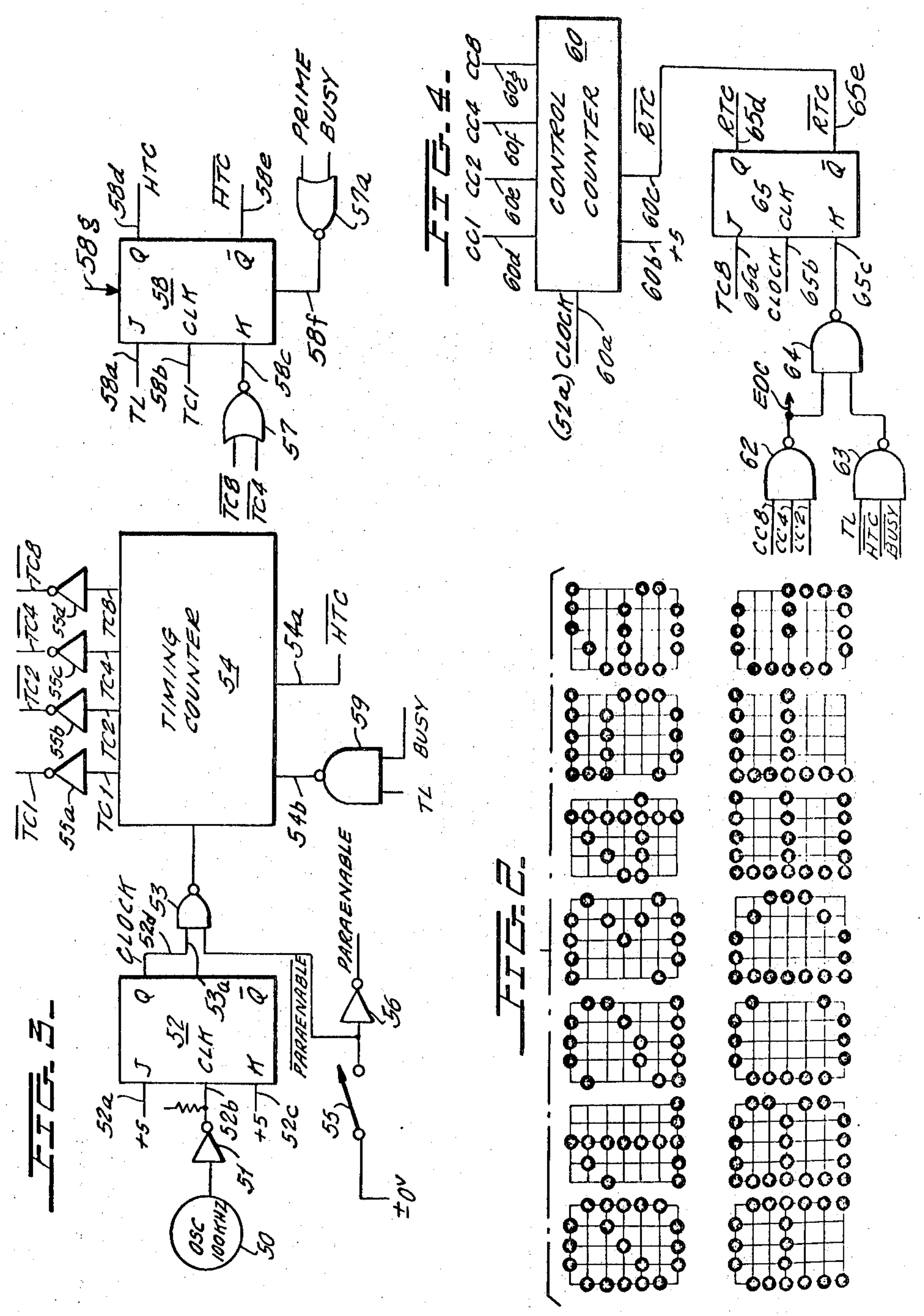
FIG. 2 shows some of the dot matrix type characters generated by the printer of FIG. 1
FIG. 3 is a logical diagram showing the timing counter employed in the system of FIG. 1 in greater detail.
FIG. 4 is a logical diagram showing the control counter employed in the system of FIG. 1 in greater detail.
Figures 7A, 7C, 8E, 8F:
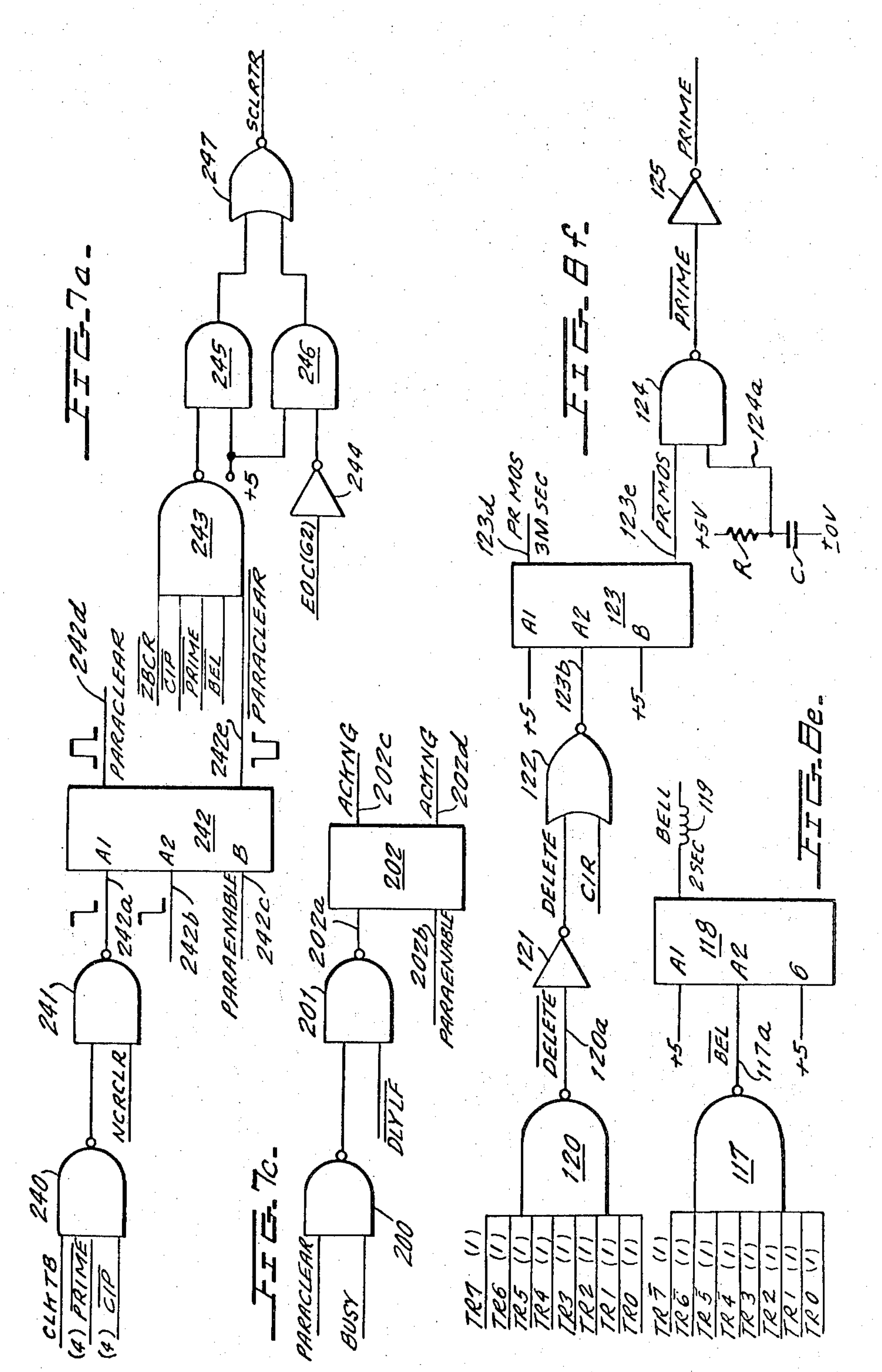
Figure 12:
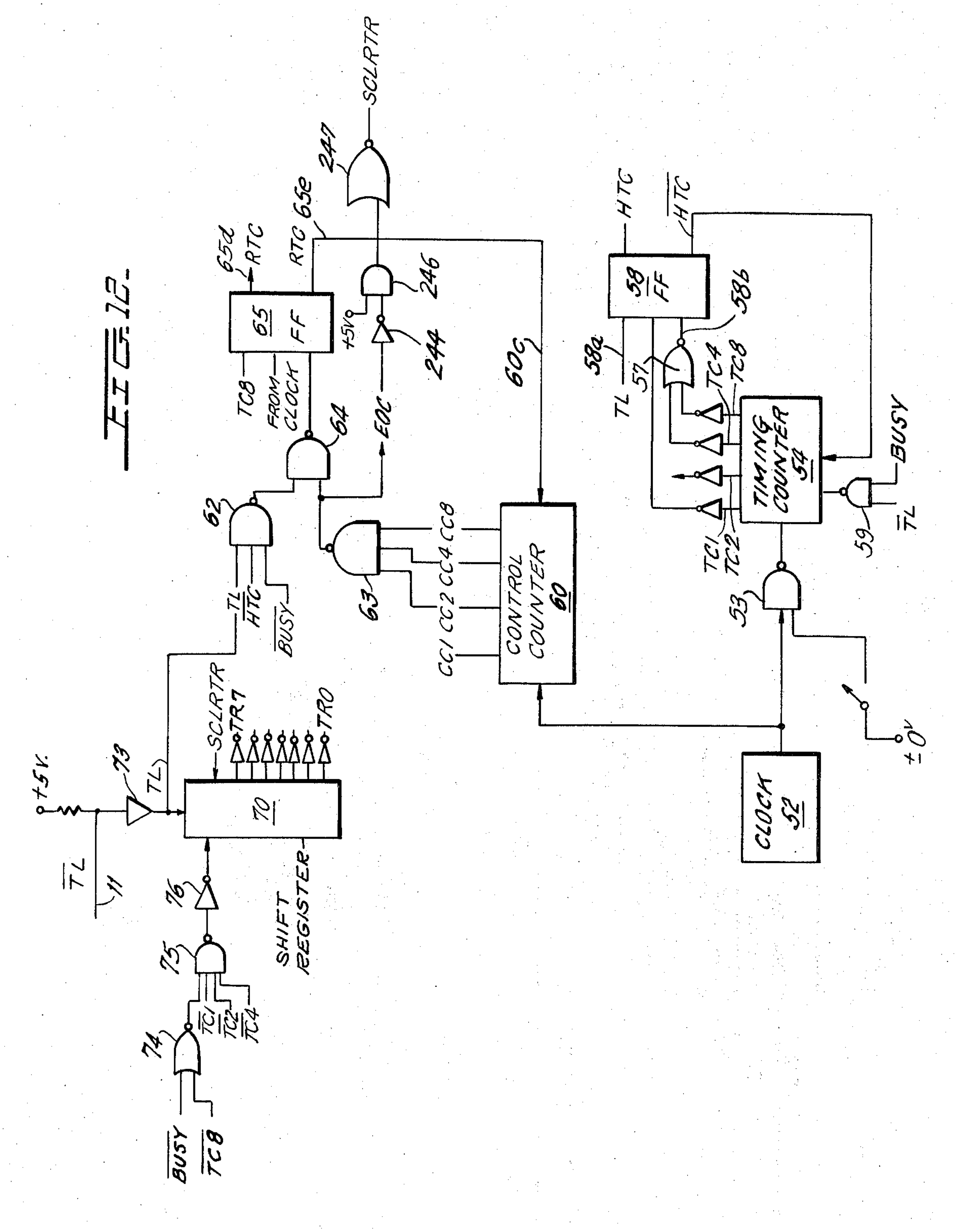

FIG. 12 is a logic diagram showing the logic circuits of FIGS. 3, 4, 6, and a portion of the logic of FIG. 7*a*.

GENERAL SYSTEM DESCRIPTION

FIG. 1 shows one preferred embodiment of the system of the present invention in block diagram form, which system 10 is comprised of an input line 11 for receiving the binary information in serial fashion from a computer which is adapted to generate a serial pulse train in which groups of pulses represent the characters to be printed. In the present preferred embodiment, each character (i.e., number, letter or symbol) is represented by a six-bit binary code which provides a total of 64 different binary combinations, each one representing a specific number, letter or symbol. The six binary bits are generated (by a computer or other transmitting facility) and are applied to input terminal 11 which, in turn, transfers the serial information to the input of a serial-to-parallel converter circuit 13. The input buffer 13 converts the serial information applied to it into parallel form and further acts as a means for isolating the input information from register 15.

The serial-to-parallel converter circuit 13 is a shift register which receives each of the six binary data bits (plus a stop and start bit) comprising each character in serial fashion and shifts each bit to the next succeeding stage of the shift register until the entire character is loaded into register 13. Input timing circuit 14 controls the serial shifting of the bits into register 13. As soon as register 13 contains all six binary bits, the input timing circuit 14 causes the six data bits to be shifted out in parallel fashion into a buffer storage 15 which, in the preferred embodiment, is comprised of a 133 stage shift register having six channels, whereby each associated stage of the six channels is adapted to store each six-bit binary word representing a character (i.e., number, letter or symbol). Each six-bit binary word is shifted in parallel into the first or loading stage of buffer storage 15 and is advanced to the next stage as soon as the next six-bit binary word is loaded, until the buffer 15 contains a total of 133 six-bit binary characters (i.e., 132 six-bit characters and a dummy character). Shifting of the characters into buffer 15 is controlled by a shifter clock circuit 16, to be more fully described. As soon as the first six-bit binary character (dummy character) loaded into buffer 15 is shifted to the right-handmost stage (i.e., the 133rd stage) of the buffer 15, the printer decodes this character as a print command to print the first line of characters. The first six-bit binary character (i.e., the dummy character) which is loaded into buffer 15 is decoded as a print control signal as soon as it is shifted into the right-handmost stage so as to enable a print control circuit 17 which energizes the solenoid 18 of a clutch mechanism to cause the carriage assembly (not shown), which has the printer head assembly mounted upon it, to move across the sheet from the left toward the right in order to perform the printing operation. It should be understood that the motor which drives the carriage assembly is continuously energized, and it is the clutch mechanism 18 which selectively engages or disengages the carriage assembly from the motor.

Once the clutch solenoid is energized, the clutch mechanism causes the carriage assembly to be mechanically linked to the energized printer motor (not shown) and thereby cause the carriage assembly and the printer head assembly to move from the left toward the right in order to print one line of characters. As shown in schematic fashion, motor 19 is continuously energized and has its output drive shaft 20 coupled to a driven shaft 21 through clutch mechanism 22. Clutch solenoid 18 has its armature mechanically coupled to clutch mechanism 22, which mechanical linkage is represented by dotted line 23*a*. When the clutch solenoid 18 is energized, clutch mechanism 22 causes driven shaft 21 to be engaged with drive shaft 20 through the clutch mechanism and thereby drive or rotate a driving roller 22. A belt 23 entrained about driving roller 24 and a free-wheeling roller 24*a* has secured thereto the carriage mechanism 25 which supports the printing head assembly 26. As soon as the clutch mechanism is engaged, belt 23 moves in the direction shown by arrow 27 to cause the carriage assembly 25 and printer assembly 26 to move from the left toward the right. The movement of carriage 25 and printing head assembly 26 is detected by a position detection device 28 which includes an elongated strip having a pattern of alternating narrow transparent and opaque segments provided on the strip. A light source 30 emits light which is focused upon the rotating pattern by a focusing lens system 31. The light passing through the transparent slits is picked up by a photocell device 32 to generate pulses representative of the selective light and dark areas provided on the pattern of the code wheel.

The output pulses of the electro-optical device 32 are applied to a matrix clock and decoder circuit 34 which generates signals at a first output 34*a* coupled into the shifter clock circuit 16 which develops pulses at its output 16*a* to cause shifting of the characters on a one-at-a-time basis from the output of character shifter circuit 15 through lead 15*a* into the input of a 64 character matrix circuit 35.

The other outputs 34*b* of matrix clock and decoder circuit 34 are applied as sequential control pulses to the 5 × 7 matrix circuit 35 for controlling the particular vertical line of print solenoids utilized to print a dot matrix-type character upon the printed sheet. The outputs of matrix circuit 35 are applied through leads 35*a* to a plurality of solenoid driving circuits represented by block 36. Each of the driving circuits energizes an associated print solenoid 36*a*.

The printer of the present invention is of the dot matrix-type in which each character, letter or symbol is comprised of a plurality of dots arranged in a 5 × 7 regular matrix in which seven vertically aligned dots are selectively printed in five vertical lines. FIG. 2 shows the composition of a few typical alpha-numeric characters, namely, the characters "1," "2," "3," "4," "A," "B," "C" and "D." It can be seen that each of these typical characters are comprised of a plurality of dots arranged in a regular matrix of seven rows and five columns. Actual printing of the characters occurs in the following manner.

Let it be assumed that the character "D" is to be printed (see FIG. 2). The carriage in moving from the left toward the right will first print the dots of column 1. All seven dots of the rows 1 through 7 will be printed. The carriage assembly, which moves continuously during the printing of a line, then moves toward the right until it is positioned at column 2. This position is detected by the photosensitive device 32 which enables the dots of rows 1 and 7 to be printed. The carriage assembly then shifts to the column 3 location where the dots of rows 1 and 7 are again printed when enabled by photocell 32. The carriage assembly then moves to the column 4 position, at which time the dots of rows 2 and 6 are printed. Finally, the carriage assembly moves to the column 5 position, at which time the dots of rows 3, 4 and 5 are printed. It can thus be seen that the printer of the present invention prints alphanumeric characters of the dot matrix-type by selectively energizing one or more of seven vertically aligned print wires as the printer head carriage passes each column location to print a character comprised of selectively printed dots arranged over a five column by seven row matrix. Obviously, any other matrix size may be employed, depending only upon the needs of the user, without departing from the spirit or scope of the present invention.

The system of FIG. 1 is further provided with a special characters decoding circuit 37 which has its inputs selectively tied to the outputs of the serial-to-parallel circuit 13 and buffer 15 so as to decode special characters as and when they may be ready for loading into or transfer out of buffer 15. The decoding circuitry 33 is comprised of a plurality of logic gating circuits for generating signals representative of the special conditions such as a BUSY condition generated at its output terminal 37*a;* a BELL condition generated at its output terminal 37*b;* a DELETE signal generated at its output terminal 37*c;* a LINE feed signal generated at its output terminal 37*d;* and a CARRIAGE RETURN signal generated at its output terminal 37*e*.

The BUSY signal which appears at output terminal 37*a* is generated when buffer 15 is fully loaded and a print mode is taking place. The BELL signal appearing at output terminal 37*b* is generated by transmitting a BELL code whenever it is desired to gain the attention of the operator. The output energizes the BELL solenoid.

The LINE-FEED signal appearing at output terminal 37*d* is the signal that is generated when a specific type of document is being printed in which a substantial number of lines of the document are to be advanced before the next line of characters is printed upon the document. This output signal energizes the LINE FEED DRIVER and its associated solenoid to perform a LINE FEED operation.

The CARRIAGE-RETURN signal appearing at output terminal 37*e* is generated in instances where a line of print consists of less than the standard 132 characters and it is, therefore, desired to advance to the next line of characters to be printed before waiting until the carriage assembly is advanced to its right-handmost position. This signal causes energization of the LINE FEED and RIBBON FEED drivers and their associated solenoids.

The PRIME logical circuit generates a signal at its output 37*f* whenever a line of print has been completed or whenever a delete code is detected.

The limit switches LS-1 and LS-2 detect the physical location of the carriage assembly to control printing and carriage return operations.

The special character decoding circuitry 37, which has its output 37*a* coupled to the input of a buffer 13, causes the BUSY logic circuit to apply a voltage level to input line 11 which prevents the serial-to-parallel buffer 13 circuit from receiving characters until the last line of characters loaded therein has been printed and the buffer 15 is cleared.

FIG. 12 shows the circuitry of FIGS. 3, 4, 5, *7a* and *7b* employed for bit timing and error detecting on both the bit and character level.

FIG. 3 is a block diagram showing the input timing circuit 14 in greater detail. Before considering the circuitry and its operation, the following brief description of the logic blocks employed will aid in understanding the system and its operation.

The logical gates which are utilized are comprised of Inverters, AND gates, NAND gates, NOR gates and Exclusive-OR gates. An Inverter gate such as the gate 56 of FIG. 3 operates to provide a binary "1" level at its output when a binary "0" level is provided at its input. The binary "1" level, in positive logic, is represented by +5 volts or "high" level. Binary "0" is represented by a "0" volt or ground level, also referred to as a "low" level. In the case where a binary "1" level input is applied to the Inverter, a binary "0" level appears at the output.

An AND gate, such as the AND gate 231 of FIG. *7b* generates a high level output only when all of its inputs are high.

A NAND gate, such as the NAND gate 53, shown in FIG. 3, generates a binary "0" level at its output when all of its input terminals are in binary "1" state and generates a binary "1" level at its output when one or more of its inputs are at binary "1" level.

A NOR gate, such as the NOR gate 57, shown in FIG. 3, generates a binary "1" level output when all of its inputs are at binary "0" and generates a binary "0" level at its output when one or more of its inputs are at binary "1" level.

An Exclusive-OR gate, such as, for example, the Exclusive-OR gate 228 shown in FIG. *7b*, generates a binary "0" level at its output when all of its inputs are at binary "1" or when all of its inputs are at binary "0." In the case where at least two of its inputs are at different binary levels, the output of the Exclusive-OR gate is at binary "1" level.

The J-K flip-flop such as, for example, the flip-flop 58 shown in FIG. 3 is provided with "J" and "K" inputs 58*a* and 58*c*, respectively; "Q" and "$\overline{Q}$" outputs 58*d* and 58*e*, respectively; a clock input 58*b*; a clear input 58*f* and a preset input 58*g*. The normal states of outputs 58*d* and 58*e* are such that they are complements of one another. To set output terminal 58*d* at a high level, a signal which is high when applied to input 58*a* when the clock pulses signal at terminal 58*b* is high determines the setting of output terminal 58*d*. The actual switching of the signal level at terminal 58*d*, however, occurs when the clock pulse level at input 58*b* goes low. To set output terminal 58*e* to a high level, a high level at input terminal 58*c* when the clock pulse level at 58*b* is high, will determine the setting of output terminal 58*e*. The actual change of state of the J-K flip-flop occurs, however, when the clock pulse level at input terminal 58*b* goes low. A low level input at clear terminal 58*f* sets the "Q" output (58*d*) low. A low level input at preset terminal 58*g* sets "Q" high. The clear and preset inputs do not require the presence of a clock pulse.

The input timing circuit is comprised of an oscillator 50 generating 10 microsecond pulses at a rate of 100 kilocycles. The output of oscillator 50 is coupled to a bistable flip-flop circuit 52 through inverter 51. Flip-flop 52 divides the output of oscillator 50 to thereby generate 20 microsecond pulses at a rate of 50 kilocycles at the output 52*d* of bistable 52 hereinafter referred to as the CLOCK. Inputs 52*a* and 52*c* are maintained at binary "1." The output 52*d* of bistable 52 is coupled to one input 53*a* of NAND gate 53 whose output is coupled to the input of a four-stage binary Timing Counter 54 having output terminals $TC_1$, $TC_2$, $TC_4$ and $TC_8$ for each of the four stages. NAND gate 53 transfers clock pulses to timing counter 54 when switch 55 is opened to impose a binary "1" level upon NAND gate 53 and thereby enable pulses from oscillator 50 to be passed to the input of timing counter 54. When switch 55 is closed, a binary "0" level is applied to gate 53 to inhibit oscillator pulses from reaching counter 54. The closing of switch 55 occurs when data is presented to the printer system in parallel fashion, which operating mode will be more fully described.

Timing Counter 54 is inhibited from counting until its input terminals 54*a* and 54*b* are both high to cause the counter to be reset and begin counting under control of the Clock output 52*a*. The $\overline{BUSY}$ signal is high when the 133 stage buffer of the printer system is not completely loaded. The generation of this signal will be more fully described in connection with FIG. 6. The TL signal is low prior to the initiation of the next binary bit. Under this condition, NAND gate 59 applies a binary "1" level signal to input terminal 54*b*. Upon the initiation of the next bit, the TL signal goes high causing the output of NAND gate 59 to go low. The $\overline{HTC}$ signal is high when the TC4 and TC8 outputs of timing counter 54 are high causing the $\overline{HTC}$ signal appearing at the output terminal of 58*e* to go high. This causes Timing Counter 54 to be reset and start a new count.

As soon as the next binary bit is received, the TL signal goes high causing the output of NAND gate 59 to go low. Simultaneously therewith, the TL signal is applied to input 58*a* of J-K flip 58 causing the HTC signal at output terminal 58d to go high upon the occurrence of the next TC1 signal from Timing Counter 54 which is applied to input terminal 58*b*. This causes the output terminal 58*e* (the $\overline{HTC}$ signal) to go high, thereby preventing the Timing Counter 54 from being reset until the next time the TL input to gate 59 goes high and simultaneously therewith until the TC4 and TC8 outputs are high.

J-K flip-flop 58 is cleared (causing output 58*d* to go low) when either the PRIME or the BUSY signal, or both, go high, in a manner to be more fully described.

The outputs of timing counter 54 are further coupled through inverter circuits 55*a*–55*d*, respectively, to develop the output signals $\overline{TC}_1$, $\overline{TC}_2$, $\overline{TC}_4$ and $\overline{TC}_8$, respectively.

The output terminals $\overline{TC}_4$ and $\overline{TC}_8$ of Inverters 55*c* and 55*d* are coupled to the inputs of NOR gate 57 whose output is coupled to one input terminal 58*c* of J-K flip-flop circuit 58. Input terminals 58*a* and 58*b* are coupled to the outputs of the input buffer line 11 (see FIG. 1) and to the $TC_1$ output of timing counter 54, respectively. Output terminal 58*e* is coupled to one reset-enable input terminal 54*a* of timing counter 54. The remaining reset-enable input terminal 54*b* is coupled to the output of NAND gate 59 whose inputs are coupled to the TL output of Inverter 73 shown in FIG. 6.

FIG. 5 shows waveforms representing the system timing. Waveform 52*d* represents the clock output 52*a* shown in FIG. 3. Although the output of oscillator 50 is not shown, it should be understood that the output of oscillator 50 is twice the frequency of clock 52. Waveforms $TC_1$ through $TC_8$ represent the output waveforms appearing at these associated terminals provided by Timing Counter 54.

Waveform $\overline{TL}$ represents the incoming binary information applied to input line 11, shown in FIGS. 1 and 6, which binary data is applied to input line 11 in serial fashion. One unique feature of the present invention is the fact that binary bits are generated during 320 microsecond intervals and that binary "0" and binary "1" bits are distinguished from one another during each 320 microsecond interval by the time interval during which each pulse is "high" (i.e., binary "1" level). For example, let it be assumed that the first binary bit applied to line 11 is a binary "1" bit. At time $t_0$, the signal level of this signal is low, and it remains low for a 200 microseconds interval, at which time the signal level goes high and remains high for the remaining 120 microseconds. The next bit transmitted which is a binary "0" bit, has its signal level low for a time duration of 80 microseconds, at which time the signal level abruptly goes high and remains high for the remaining 240 microseconds of the bit transmission interval of 320 microseconds.

The binary bits applied to the input line 11 are inverted by Inverter means 73 to be more fully described in connection with FIG. 6. Since the initial portion of either a binary "0" or a binary "1" level bit is low, the aforementioned Inverter inverts the signal to apply a high level to input terminal 58*a* of flip-flop 58. As soon as the TC1 output of Timing Counter 54 goes low, a high level input is applied to input terminal 58*b* of flip-flop 58 causing the output terminal 58*d* of bistable flip-flop 58 to go high, as shown by the waveform HTC. The signal level at output terminal 58*d* remains high until the output levels at $TC_4$ and $TC_8$ of counter 52 go high (which occurs 240 microseconds after the initiation of a binary bit interval), which causes the output of NOR gate 57 (coupled to the $\overline{TC4}$ and $\overline{TC8}$ outputs of Inverters 55*c* and 55*d*) to go high, applying a high level input to terminal 58*c* of the bistable flip-flop, causing output terminal 58*d* to go low upon the occurrence of the next TC1 signal. Output 58*d* remains at the low level for the remaining 80 microseconds of the first 320 microseconds binary bit interval and goes high again when the next binary bit transmitted (see waveform TL) is applied to input 58*b* followed by the next negative transition of output TCL (which occurs 330 microseconds after time $t=0$) as is shown by the waveform 58*d* of FIG. 5.

FIG. 4 is a block diagram showing the Control Counter circuitry included within input timing circuit 14 of FIG. 1, and is comprised of a four-stage binary Control Counter 60 which derives its input at 60*a* from the Clock output 52*d*, shown in FIG. 3. The four stages of the counter each have an associated output $CC_1$, $CC_2$, $CC_4$ and $CC_8$, which outputs are utilized to develop further timing information. NAND gate 62 has its three input terminals coupled to the $CC_2$, $CC_4$ and $CC_8$ output terminals of Counter 60. A second NAND gate 63 has its input terminals coupled to the input line (TL) 11 of FIGS. 1 and 6, the $\overline{BUSY}$ line of Inverter 72 (see FIG. 6), and the HTC output terminal 58*e* of the flip-flop 58 shown in FIG. 3. The outputs of NAND gates 62 and 63 are coupled to corresponding inputs of a NAND gate 64 whose output is coupled to one input terminal 65*c* of a bistable flip-flop circuit 65 whose remaining input terminals 65*a* and 65 *b* are respectively coupled to the TC8 output terminal of Counter 52, shown in FIG. 3, and to the Clock output 52*d* of bistable 52. It can be seen from the waveforms shown in the timing diagram of FIG. 5 that, when TC8 goes positive and when the next negative transition of the clock output is generated (180 microseconds after time $t=0$), the output at terminal 65*d* (RTC) goes high, as shown by waveform 65*d* in FIG. 5. Resetting of counter 60 to permit counting is caused by a low $\overline{RTC}$ signal and +5 volts at input terminals 60*c* and 60*b*, respectively. The RTC output remains high until either one of two conditions occur. If all of the inputs of either NAND gate 62 or NAND gate 63 go high then the output of one of the NAND gates 62 or 63 goes low, causing the output of NAND gate 64 to go high to thereby reset the level at output terminal 65*d* to the low level. The output of gate 63 normally goes low at the beginning of each bit. However, either an error in transmission or a stop pulse will enable counter 60 to "time out" whereby outputs CC2, CC4 and CC8 cause gate 62 to go low and generate EOC which is utilized in a manner to be more fully described in connection with FIGS. 6 and 7 to clear the serial-to-parallel converter 70 (see FIG. 7) before it can shift an invalid character into 133 character shifter 136 or to clear converter 70 prior to the receipt of the next coded character.

FIG. 6 is a detailed block diagram of the serial-to-parallel converter circuit 13 shown in FIG. 1 which is comprised of a nine-stage shift register 70 having an input line 70*a*, output lines TR0 through TR8 and a shift pulse line 70*b*.

The incoming stream of binary serial information is coupled to line $\overline{TL}$ and applied to the input line 70*a* through an Inverter circuit 73. A seven-input NAND gate 71 receiving input signals (to be more fully described) normally develops a binary "1" level signal (referred to as the BUSY signal) when the 133 stage shift register is available to receive coded characters. This signal is inverted by Inverter circuit 72 (whose output is $\overline{BUSY}$) to apply a low level output to the input of Inverter 73 enabling the binary bits from the incoming data stream to pass to the serial-to-parallel converter circuit 70. In the case where the 133 stage shift register is fully loaded with coded characters and is thereby operating to print these characters, the $\overline{BUSY}$ signal applied to the input of Inverter 73 is high preventing further loading of the multistage shift register. As soon as the multistage shift register 70 is fully loaded, the signals applied to the input of Nand gate 71 (which will be more fully described hereinbelow) cause the output of NAND gate 71 to go low, which low level in inverted by Inverter 72 to block the passage of any further binary information to the serial to parallel converter circuit 70. Shift pulses for shifting the serial data presented to input line 70*a* are controlled by the circuits comprised of Nor gate 74, NAND gate 75 and Inverter 76 which operate in a manner to be more fully described.

The operation of the timing circuits and shift register, as shown in FIGS. 3–6 and 6*a*, is as follows:

The input line $\overline{TL}$ goes low (i.e., binary "0" at the beginning of each binary bit. In the case of a binary "1," the signal remains low for 200 microseconds and is abruptly changed to binary "1" level (i.e., goes high) where it remains high for the remaining 120 microseconds. At the termination of the bit interval, the signal level again goes low (i.e., binary "0"). In the case of a binary "0" bit, the signal level remains low for a period of 80 microseconds and abruptly goes high (i.e., becomes binary "1") and remains high for the remaining 140 microseconds of the bit interval. Considering waveform 73*a* in FIG. 5 which represents the data applied to input 73*a* of Inverter 73 shown in FIG. 6, $\overline{TL}$ goes low at time $t=0$. This condition is applied to input terminal 56*b* of J-K flip-flop 58. Upon the application of the next TC1 pulse from counter 54 (see waveform 54 of FIG. 5) output terminal 58*d* goes high (see waveform 58*d* of FIG. 5) and remains high until TC4 and TC8 (see waveforms 52*c* and 52*d* of FIG. 5) are both high which occurs 240 microseconds after time $t=0$ at which time the clock pulse TC1 is low causing the output of terminal 58*d* to go low and the output at terminal 58*e* to go high. Counter 54 is reset at the beginning of each bit interval as a result of the signal TL and the $\overline{BUSY}$ signal being high and $\overline{HTC}$ (i.e., the output of terminal 56*e*) being high. Bits are loaded into the shift register 70 when the shift pulse for the serial-to-parallel converter 70 is generated. The shift pulse is generated 160 microseconds after time $t=0$ by means of gates 74–76. NOR gate 74 develops a binary "1" output when both the BUSY signal and $\overline{TC8}$ are both low (i.e., binary "0"). This binary "1" level output is applied to one input of NAND gate 75 which develops a binary "0" level output when the output of Nor gate 74 and $\overline{TC1}$, $\overline{TC2}$, and $\overline{TC4}$ are all binary "1" (i.e., when TC1, TC2, TC4 and TC8 are low). As can be seen from waveforms 54*a*–54*c*, this occurs 160 microseconds after time $t=0$. This output level is inverted by Inverter circuit 76 to apply a binary "1" level signal to shift-pulse input terminal 70*b* to shift the binary state of the bit into shift register 70 wherein the status of the bit is established by the level of the $\overline{TL}$ signal during the interval in which the output of Inverter 76 is high.

Counter 60 is inhibited from initially a counting operation until TC8 goes high. This level is applied to input terminal 65*b* of J-K flip-flop 65 causing output terminal 65*d* to go high and output terminal 65*e* to go low. Output terminal 65*e* is coupled to input terminal 60*c* of counter 60 enabling the counter to be stepped under control of clock signal 52*a*. Flip-flop 65 is reset by means of input signals applied to NAND gates 62, 63 and 64 at a time when either CC8, CC4, CC2 or TL, $\overline{\text{HTC}}$, and $\overline{\text{BUSY}}$ signals are all high, thereby causing output terminals 65*e* and 65*d* to go high and low, respectively, upon the occurrence of the next output pulse from the oscillator 52*d*. This operation can also be seen from a consideration of waveforms 60*d*, 60*e*, 60*f*, 73*a* and 58*d* of FIG. 5. Bistable flip-flop 65 will be reset to reset the count of counter 60 in the case when the output of either NAND gate 62 or 63 is binary "0." The output of NAND gate 63 will go low when the CC8, CC4 and CC2 inputs are all high which will occur 160 microseconds after the enablement of counter 60 to reset and beging counting. Since counter 60 is not enabled until 160 microseconds after the initiation of any bit interval, resetting of the counter under control of the CC8, CC4 and CC outputs will only occur if the bit interval erroneously is longer than the alloted 320 microseconds. Counter 60 will thus be reset if the TL, $\overline{\text{HTC}}$ and $\overline{\text{BUSY}}$ signals are in binary "1" state which occurs at the beginning of each bit interval, if the bit interval is of correct length. Counter 60 is permitted to "time out" at the end of a character due to the transmission of a 640 microsecond pulse which is transmitted at the end of each character (see FIG. 5). The EOC signal generated by gate 62 of FIG. 4 is employed in the logic of FIG. 7*a* to clear serial-to-parallel converter 70 after each character is loaded into buffer 15 from shifter 70.

THE POSITION CONTROL APPARATUS

The exact positioning of the printer head assembly is determined by the position control apparatus shown in FIG. 11 which consists of an elongated opaque mylar strip 160 having a printed pattern thereon provided with a plurality of relatively thin transparent slits 160*a* uniformly spaced along the mylar strip. A light source 164 positioned behind the strip and a photodetector 162 are mounted upon the printer head assembly carriage to be movable therewith. The mylar strip is mounted in a stationary fashion and extends the width of the printer platen. In one preferred embodiment, 132 slots are positioned across the length of strip 160 in an equally spaced fashion. A mask 161 provided with a thin slit 161*a* is positioned in front of the photodetector 162 so as to limit light from only one of the slits 160*a* from impinging upon the photodetector. The photodetector generates an output pulse as the carriage moves (at a substantially constant rate) in the direction shown by arrow 162*a*, which pulse is applied to NAND gate 163. The remaining input of gate 163 is high when the system is in the "carriage is printing" (CIP) mode. NAND gate is thereby enabled to pass pulses to the input of a pulse widening circuit 165 which may, for example, be a one-shot multivibrator to generate a pulse of 400 microseconds pulse duration. The output signal at 165*a* referred to as a Strobe pulse, is applied to the input terminal 166*a* of a divide-by-six counter 166 having three outputs 166*b*–166*d*. An inhibit (CIR) pulse is derived from the output terminal 144*d* of circuit 144 shown in FIG. 9*d* (which is derived in a manner to be more fully described) and applied to input 166*e* in order to prevent counter 166 from generating output signals during the time in which the carriage assembly is moving in the line-return direction. Outputs 166*b*–166*d* are coupled to Inverter circuits 167–169, respectively, to make available both the output levels at output terminals 166*b*–166*d* and their complements.

The output signals at terminals 166*b*–166*d* and their complements are selectively applied to the input terminals of a group of NAND gates 170–175, shown in FIG. 10*b*. The output terminals 166*b*–166*d* are so connected as to develop output signals which operate the 64 character generator 5 × 7 matrix 178 in a sequential fashion. For example, NAND gate 170 has its inputs coupled to the outputs 167*a*–169*a* of inverter circuits 167–169, respectively, as well as the Strobe output 165*a* of circuit 165. As soon as all of these outputs are in binary "1" state, indicating an initiation of the printing operation in which the printer head assembly is positioned at the extreme left-hand end of the next line to be printed, the output of NAND gate 170 generates a low level which is inverted by Inverter 176*a* to develop the DCWφ signal which is utilized in the circuit of FIG. 7*b* to shift the next coded character in buffer 15 into the output stage.

NAND gate 171 develops a binary "0" level signal when all of the signals at output terminals 166*b*, 168*a*, 169*a* and the Strobe output 165*a* are all at binary "1" level (i.e., high). This output is inverted twice by Inverter circuits 176*b* and 177*a*, respectively, to couple an output signal to input terminal 178*a* of the character generator circuit 178. It should be noted that this occurs upon the accumulation of the first count in counter 166. The application of this signal to input terminal 178*a* cooperates with the coded character binary input levels applied to input terminals 178*f*–178*n*, respectively, (and shifted into the output stage of buffer 15 by the DCWφ signal) to selectively energize one or more of the output terminals 178*n*–178*u* which control the print solenoids to be energized during the printing of the left-hand most column of the first character. Each of the output terminals 178*n*–178*u* is coupled to a driver circuit. Only one of these driver circuits has been shown in FIG. 11*b* for purposes of simplicity, it being understood that the remaining circuits are substantially identical in design and function. Output terminal 178*n* is coupled to the base of transistor $T_1$ through resistor $R_1$. $T_1$ is rendered conductive when the level at output terminal 178*n* goes high to cause its emitter electrode to go high and thereby render transistors $T_2$ and $T_3$ conductive to energize print solenoid SOL. 1 for operating its associated printwire. A print solenoid and printer head assembly which has been used to great advantage in the printer system of the present invention is set forth in detail in application Ser. No. 37,815, filed May 15, 1970, abandoned in favor of continuation application Ser. No. 179,457 filed Sept. 10, 1971, both of said applications being assigned to the assignee of the present invention. Of course, any other print assembly may be used, if desired.

The remaining gates 172–175 operate in a similar fashion to provide output signals occurring in time sequence to thereby energize the print wires of the solenoids in time sequence as the printing head assembly moves (at a substantially constant rate) from the left toward the right to selectively make contact with the paper document and thereby print selected dots upon the document to form the appropriate character.

Matrix 178 may, for example, be a MOS-LSI character generator of the type 2A4103 manufactured by the Texas Instrument Corporation.

CARRIAGE RETURN (CR) GENERATING CIRCUIT

Figure 7B:
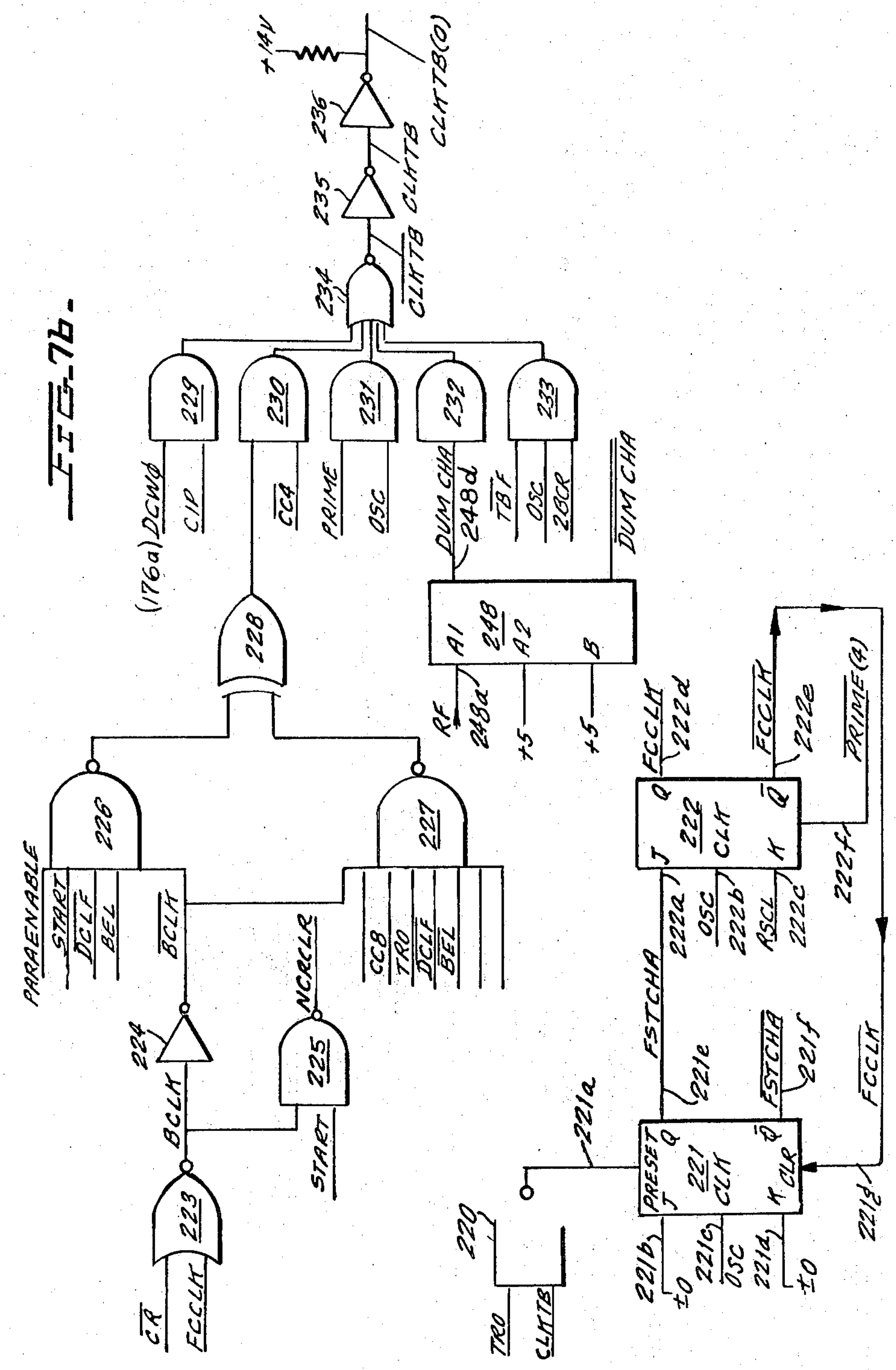
Figures 8A, 8B, 8C, 8D:
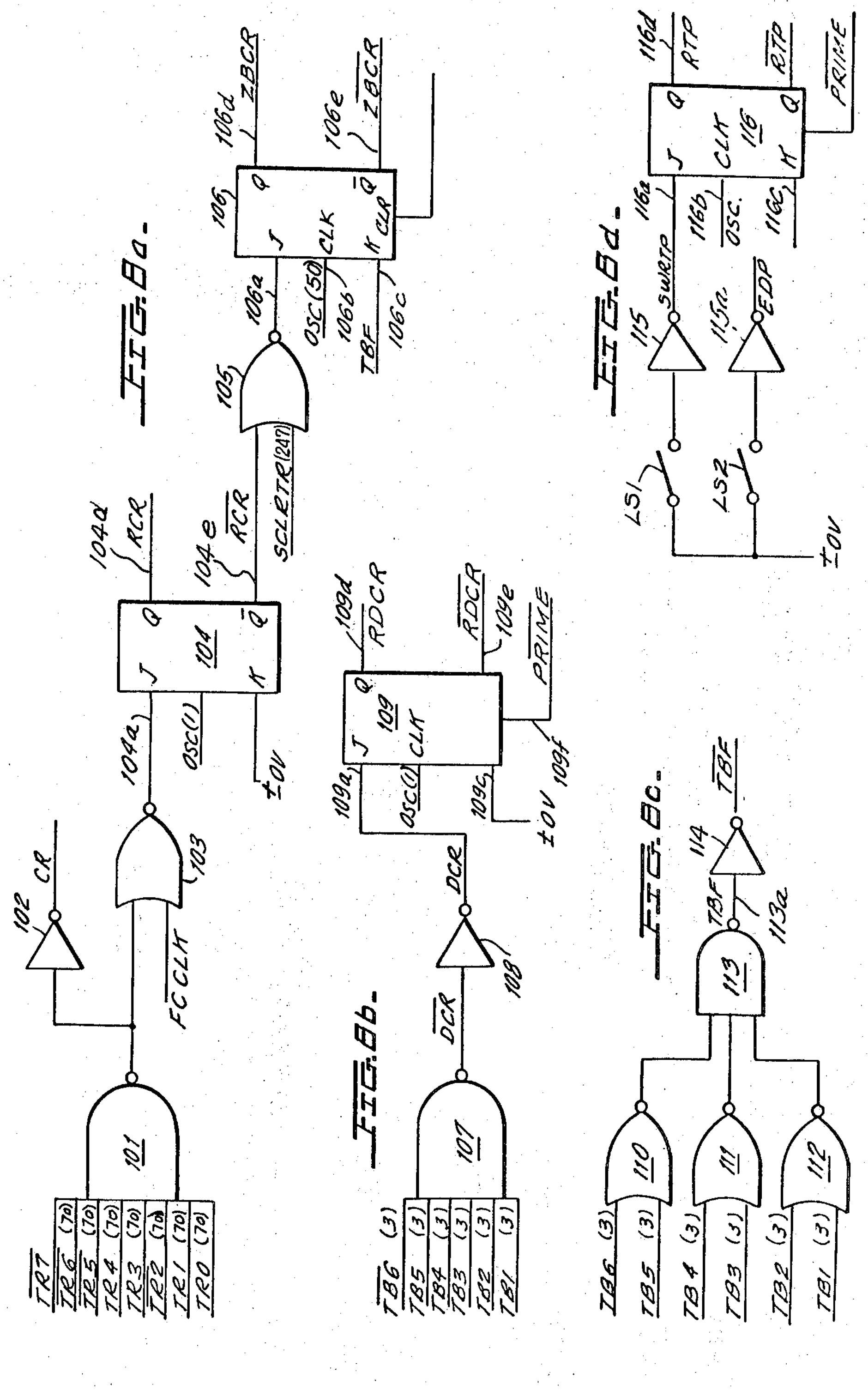
Figures 9A, 11:
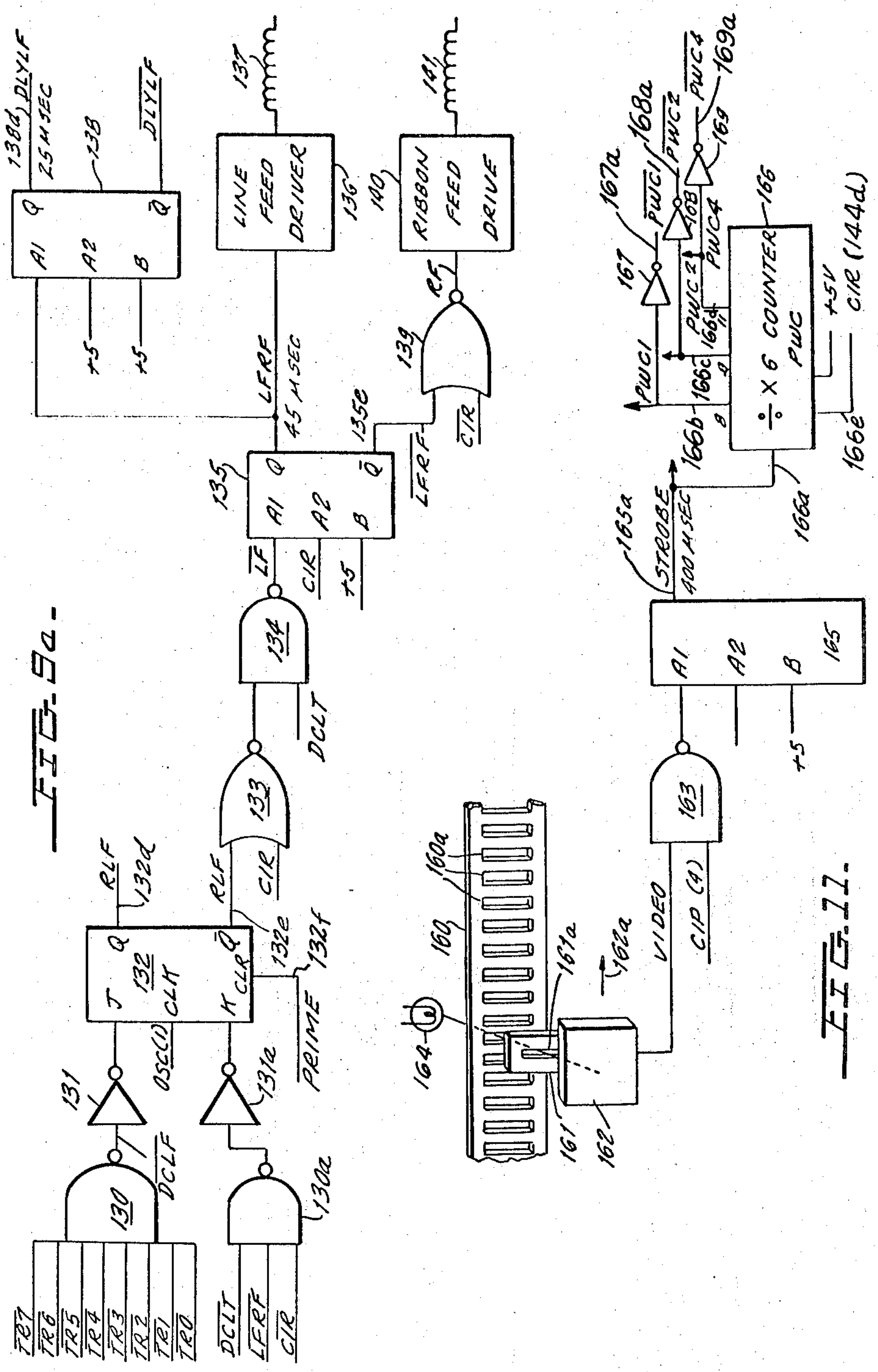
Figures 9B, 9C:
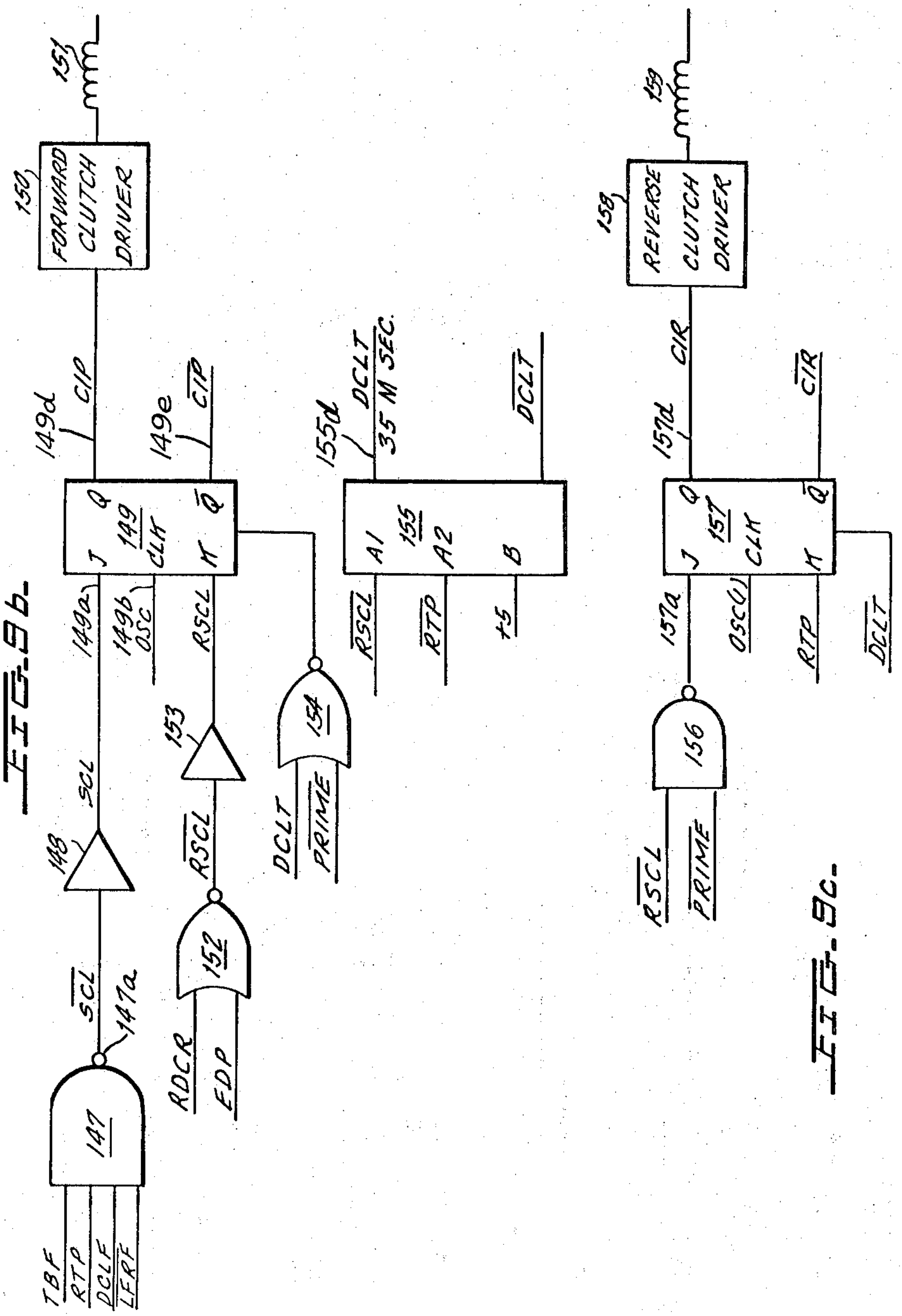

NAND gate 101 of FIG. 8*a* goes to binary "0" when the coded character shifted into the serial-to-parallel converter circuit 70 (in binary form) is 11011000 to indicate that a carriage return operation is requested. Inverter 102 provides a binary "1" output (CR-signal) which is used to generate the Special STR5 and STR6 signals to be more fully described in connection with FIGS. 6 and 7*b*. The low output of NAND gate 101 is coupled to one input of NOR gate 103 to cause its output to go high upon the receipt of a low level signal from the output 222*d* (FCCLK) of J-K flip-flop shown in FIG. 7. This output signal is applied to the input 104*a* of J-K flip-flop 104 for developing a high level signal when the next pulse from oscillator 50 (see FIG. 3) goes negative. The complementary output ($\overline{RCR}$) at terminal 104*e* is applied to one input to NOR gate 105 and as one input to NAND gate 71 of FIG. 6. In the presence of a carriage return request, $\overline{RCR}$ goes low disabling gate 71 to prevent data from being fed to serial-to-parallel converter 70 of FIG. 6. In the absence of a carriage return request, $\overline{RCR}$ goes high enabling gate 71 to go low which condition is inverted by Inverter 72 to enable data to enter serial-to-parallel converter 70.

Flip-flop 104 is reset upon the occurrence of the next oscillator pulse when either the output of NAND gate 101 goes high or when the output 22*d* of flip-flop 222 (see FIG. 7*b*) goes high.

NOR gate 105 is low when either $\overline{RCR}$ is high (absence of carriage return) or when the output of NOR gate 247 in FIG. 7 goes high (the serial-to-parallel converter is cleared as a result of either an invalid bit or character or receipt of an end of character pulse). When the inputs are both low, NOR gate 105 causes output 106*d* of J-K 106 flip-flop to go high during the next negative transition of oscillator 50 (FIG. 3). Output 106*d* (ZBCR) is applied to one input of AND gate 233 shown in FIG. 7*b* to rapidly shift the characters loaded into the 133 character buffer 180 of FIG. 10*a* to the right-hand end of buffer 180. The carriage return code is used when it is desired to print less than a full line of characters (i.e., 132 characters). The rapid shifting of the characters through buffer 180 continues until the "dummy" character reaches the output stage of buffer 180 at which time the logical circuitry of FIG. 8*c* decodes the "dummy" character to generate a high TBF signal which automatically resets flip-flop 106 and terminates the rapid shifting of characters through buffer 180. (ZBCR) is applied to one input of gate 243 of FIG. 7*a* to permit clearing of serial-to-parallel converter 70 during the carriage return operation.

BUFFER CARRIAGE RETURN (DCR) CIRCUIT

The circuit of FIG. 8*b* is comprised of NAND gate 107 which is coupled to selected terminals of the output stage of 133 character buffer 180 shown in FIG. 10. Gate 10 develops a binary "0" level output ($\overline{DCR}$) when the character contained in the output stage of the shifter buffer 180 (in binary form) is 111110 which represents a carriage return operation called for by buffer 180. This output (DCR) is inverted by gate 108 driving the output 109*d* (RDCR) of flip-flop 109 high when the next oscillator pulse goes negative. RDCR deactivates the forward clutch driver of FIG. 9*b* and activates the reverse clutch drive of FIG. 9*c* (in a manner to be more fully described) when high. Output terminals 109*d* (RDCR) and 109e ($\overline{RDCR}$) go low and high, respectively, after the carriage return function is completed, under control of the $\overline{PRIME}$ signal developed by the circuit of FIG. *8f* (to be more fully described hereinbelow).

BUFFER FULL (TBF) GENERATING CIRCUIT

FIG. 8*c* is comprised of three NOR gates 110–112 having their input terminals connected to selected outputs of the output stage of 133 character buffer 180. The outputs of NOR gates 110–112 go high when the output terminals $TB_1$–$TB_6$ are all in binary "0" state causing the output 113*a* (TBF) of NAND gate 113 to go low, which condition is inverted by Inverter gate 114. When the TBF output is low (i.e., $\overline{TBF}$ is high) J-K 106 of FIG. 8*a* is reset to prevent the buffer 180 from being cleared during loading. TBF also enables the generation of shift pulses (FIG. 7*b*) to sequentially shift the data stored in buffer 180 into the character generator 156 (FIG. 11*b*) and is utilized in FIG. 9*c* to enable the forward clutch to be energized to move the printer head assembly.

CARRIAGE POSITION DETERMINING CIRCUIT

FIG. 8*d* shows the circuitry, which together with the circuitry of FIGS. 9*a*–9*c* functions to control the direction of movement of the printer head assembly carriage. As shown in FIG. 8*d*, limit switch LS1 is physically engaged by the carriage assembly and closes when the printer head carriage reaches its left-hand most position. This low level is inverted by Inverter 115 to set the output 116*d* (RTP) of J-K flip-flop 116 high when the oscillator output (50 of FIG. 3) goes negative. RTP goes low when the first character is printed under control of signal DCW5 from inverter 176*f* of FIG. 10*b*. RTP may also be driven to a low level when $\overline{PRIME}$ is low which occurs upon the initiation of a carriage return operation.

BELL GENERATING CIRCUIT

FIG. 8*e* shows the logical circuitry for generating a Bell signal and is comprised of a NAND gate 117 whose output 117*a* goes high when the binary bit positions TRO–TR7 of the coded character in the serial-to-parallel converter circuit 70 is (in binary form) 11110000. This output is applied to one-shot multivibrator 118 to energize a bell or alarm solenoid 119 for approximately 2 seconds to indicate that the operator's attention is requested. This may occur when a particular message requires immediate attention. The Bell signal also is employed in FIGS. 7*a* and 7*b* to clear serial-to-parallel converter 70 and to inhibit shifting of data through the buffer when BELL is high.

PRIME GENERATING CIRCUIT

FIG. 8*f* shows the circuitry for generating the PRIME signal and is comprised of NAND gate 120 whose output 120*a* ($\overline{DELETE}$) goes low when the binary bits of the bit positions TRO–TR7 of the serial-to-parallel converter circuit 70 are 1111111. This special code calls for a deletion (i.e., clearing) of characters shifted into buffer 180. This output is inverted by Inverter gate 121 which applies its output (DELETE) to one input of NOR gate 122 whose remaining input receives the CIR signal from the J-K flip-flop 157 of FIG. 9*d.* When the carriage is printing, the NOR gate output 122, which is coupled to input 123*b* of multivibrator 123, remains low. When printing stops, CIR goes low causing NOR gate 122 to go high. This causes one-shot multivibrator 123 to simultaneously generate positive and negative going 3 milliseconds pulses at outputs 123*d* (PRMOS) and 123*e* ($\overline{PRMOS}$) respectively. Output 123*e* ($\overline{PRMOS}$) causes the output $\overline{PRIME}$ of NAND gate 124 to go low (for the 3 milliseconds interval) causing the output of Inverter 125 (PRIME) to go high. The $\overline{PRIME}$ signal is applied to the clear inputs 109*f* of flip-flop 109 (see FIG. 8*b*) 116*f* of flip-flop 116 (see FIG. 8*d*) to set RDCR low (FIG. 8*b*) and to set the RTP signal low (see FIG. 8*d*) to prevent printing. When PRIME goes low, clear 132*f* of flip-flop 132 goes low to set the RLF low (see FIG. 9*a*) to permit line feed and ribbon feed operations. $\overline{PRIME}$ also enables the reverse clutch (see FIG. 9*c*) to perform a carriage return operation. PRIME is also employed in FIG. 7*b* to clear buffer 180 in a manner to be more fully described.

Upon initial turn-on of the machine, the common terminal between resistor R and capacitor C is at ground potential, causing the output of ($\overline{PRIME}$) of NAND gate 124 to go high. PRIME goes low at this time to set $\overline{RLF}$ high (see FIG. 9*a*). This ultimately causes a ribbon feed signal (RF) to be generated, which signal automatically causes a dummy character (DUMCHA — see FIG. 10*a*) to be loaded into buffer 180 preparatory to the receipt of the first character by serial-to-parallel converter 70. The printer is then ready to receive data.

LINE-FEED AND RIBBON FEED GENERATING CIRCUIT

Line-feed and ribbon-feed signals are generated by the circuitry of FIG. 9*a* which is comprised of NAND gate 130 whose input terminals are coupled to the output terminals TRO-TR7 of serial to parallel converter circuit 70 shown in FIG. 6 for generating a line-feed signal when the character in converter circuit 70 (in binary form) is 10101000. The output ($\overline{DCLF}$) of NAND gate 130 is coupled to inverter 131 to set output 132*d* (RLF) of J-K flip-flop 132 high when the next oscillator pulse goes negative. This causes output 132*e* ($\overline{RLF}$) to go low causing the output of NOR gate 133 to go high when CIR (carriage is returning) goes high. This causes the output of NAND gate 134 to go high (regardless of the state of $\overline{DCLT}$) to enable one-shot multivibrator 135 to go high and low at its respective outputs 135*d* (LFRF) and 135*e* ($\overline{LFRF}$) for an interval of 45 milliseconds. LFRF energizes line feed driver 136 and hence solenoid 137 to perform a line feed operation. LFRF also triggers one-shot multivibrator 138 to generate an output pulse (DLYLF) at terminal 138*d* which is employed for the special TR6 (STR 6) signal of FIG. 10*a* to load a dummy character into buffer 180 prior to the receipt of the first character to be printed by serial-to-parallel converter 70 of FIG. 6.

Output terminal 135*e* ($\overline{LFRF}$) enables NOR gate 139 to go high when $\overline{LFRF}$ is low (for 45 milliseconds) and $\overline{CIR}$ is low (i.e., carriage return is being performed) to energize ribbon feed driver 140 and ribbon feed solenoid 141.

Flip-flop 132 is reset by NAND gate 130*a*, which goes low when its inputs are all high. $\overline{DCLT}$ goes high (See FIG. 9*b*) after a forward clutch drive operation has been initiated; $\overline{LFRF}$ goes high after a ribbon feed operation has been completed (See output 135*c* of FIG. 9*a*); and $\overline{CIR}$ goes high after a carriage return operation has been completed. The low output of NAND gate 130*a* is inverted by inverter 131*a* to reset the outputs 132*d* (RLF) and 132 (RLF) to low and high respectively, to wipe out the line-feed and ribbon feed requests.

FORWARD CLUTCH CONTROL CIRCUIT

The circuitry for controlling the operation of the forward clutch solenoid is shown in FIG. 9*b* and is comprised of NAND gate 147 which generates a low level signal at its output 147*a* when both line feed and ribbon feed operations are not being performed ($\overline{LFRF}$ is high — See FIG. 9*a*); when the carriage has returned to its left-hand-most position (RTP is high — See FIG. 8*d*); and when buffer 156 is full (TBF is high — See FIG. 8*b*). Inverter 148 thus develops a high level signal (SCL) which is applied to input 149*a* of J-K flip-flop 149 setting output terminal 149*d* (CIP) high when the next oscillator pulse goes negative to energize forward clutch drive 150 and forward clutch solenoid 151, thereby driving the carriage for the printer head assembly in the printing direction (i.e., left to right).

The clutch assembly is deenergized by means of NOR gate 152 which generates a low level signal at its output 152*a* ($\overline{RSCL}$) when either: the RDCR signal (See FIG. 8*b*) is high (See output 109d of J-K flip-flop 109 shown in FIG. 8*b*) to indicate that the character in the output stage of the 133 character shifter is a "carriage return" character; or when the EOP signal (derived from inverter 115*a* of FIG. 8*d*) indicates that the carriage for the printer head assembly has moved to its extreme right-hand position as a result of the closure of limit switch 114a which indicates that the line of print has been completed.

The output of NOR gate 152 thus goes low only when either EOP or RDCR goes high to alternatively deenergize the forward clutch solenoid at the end of the line of print (when EOP is high) or sooner (when RDCR is high) in the case where carriage return is programmed to occur before a full line of print is generated. Inverter 153 converts the low level to a high level to cause output 149*d* (CIP) to go low when the next clock pulse applied to input 149*b* goes negative.

NOR gate 154 sets output 149*d* (CIP) low when either $\overline{PRIME}$ (See FIG. 8*f*) or DCLT (See 155d—FIG. 9*b*) goes high. DCLT (output 155d of one-shot multivibrator 155) goes high for 35 milliseconds when $\overline{RSCL}$ (output of NOR gate 152) goes high and when $\overline{RTP}$ (See output 116*e* — FIG. 8*d*) is high. $\overline{RTP}$ is high when the printer head carriage has completed printing one character, while $\overline{RSCL}$ goes high when the carriage return has been performed (EOP goes low) and when $\overline{PRIME}$ resets RDCR.

THE REVERSE CLUTCH CONTROL CIRCUITRY

The control of the reverse clutch solenoid is performed by the circuitry of FIG. 9*c* which is comprised of NAND gate 156 whose output goes high when either the $\overline{PRIME}$ signal is low or when the $\overline{RSCL}$ is low.

$\overline{RSCL}$ is low when the carriage return is called for. $\overline{PRIME}$ is low when either a delete operation is called for or when the carriage is returning. A high level at the output of NAND gate 156 sets the output 175d (CIR) of J-K flip-flop 157 high when the next oscillator pulse goes negative, causing reverse clutch driver 158 and reverse clutch solenoid 159 to be energized to drive the printer carriage in the line-return direction. CIR is applied to NOR gate 122 of FIG. 8f to cause $\overline{PRIME}$ to go low and thereby maintain CIR low.

The reverse clutch solenoid 159 is deenergized when the carriage assembly arrives at its extreme left-hand position which is detected by limit switch LS1 shown in FIG. 8d, causing closure of the limit switch LS1 to provide a binary "1" (i.e., high) level output at input 116a (after inversion by circuit 115) to cause RTP to go high and reset flip-flop 157 at the next negative going oscillator pulse.

132 CHARACTER SHIFTING CIRCUIT

FIG. 10a shows the 132 character buffer 180 which is comprised of three 133 stage shift registers 180a, 180b and 180c having their stages connected in cascade fashion, wherein each stage is capable of storing two binary bits. In operation, the outputs TR1–TR6 of serial-to-parallel converter circuit 70 shown in FIG. 6 are coupled to the TR1, STR2, TR3, TR4, STR5 and STR6 inputs, respectively, of the lefthandmost or loading stage of each register 180a–180c. The outputs $\overline{TR1}$–$\overline{TR6}$ of serial-to-parallel converter 70 are coupled through inverter circuits 181–186 to inputs of shift registers 180a–180c, respectively, which represent the loading stages of the shifter circuit 180.

Assuming that the character loaded into serial-to-parallel converter circuit 70 is a valid one, as determined by the logical circuitry of FIGS. 7 a and 7b, the CLKTB shift pulses sequentially generated by the logic circuitry of FIGS. 7a and 7b to be more fully described, are applied to the input terminals 180a-1, 180b-1 and 180c-1 of the registers 180a–180c, respectively, to load the valid character into the lefthand-most or loading stage and thereby shift all previous characters loaded therein one stage to the right.

The input terminals STR2, STR5 and STR6 are utilized to generate the dummy character which is first loaded into buffer 180 to initiate each print operation. Input terminals STR2, STR5 to STR6 also accept the TR2, TR5 and TR6 binary outputs of the serial-to-parallel converter when the buffer 180 is being loaded with data. The Exclusive-OR gate 187 shown in FIG. 10a, develops a high output level when either of its inputs or TR2 or CR (generated by the inverter circuit 102 of FIG. 8a) are high and is low when both inputs are simultaneously low or high. The STR5 signal is generated by the Exclusive-OR gate 188 which operates in the same manner as gate 187. These output signals are applied to the associated input terminals of buffer 180 to generate either a data character or the dummy character which, in binary form is 010010, and which will appear at the output terminals TB1–TB6 and $\overline{TB1}$ – $\overline{TB6}$ when the dummy carrier is shifted to the output stage of registers 180a–180c.

STR6 is derived as follows:

NAND gate 189, which goes low when the ribbon feed signal RF is high (just before a print operation begins and when $\overline{PRIME}$ is high (which is the normal state of $\overline{PRIME}$), to set NAND gate 189 low, thereby setting NAND gate 190 high. Alternatively, when $\overline{TR6}$ is high (TR6 is binary "0"), NAND gate 190 goes low. When either NAND gate 190 goes high or when the DLYLF goes high (but not both) then STR6 goes high to set TB6 high to load the dummy character. If DLYLF is high, the state of the output of NOR gate 191 will be reversed to convert the character in converter 70 to a dummy character when it is loaded into the buffer 180.

The output terminals TB1–TB6 are each coupled through inverter circuits 192a–192f, respectively, for generating signals TB1′–TB6′ which are applied to the decoding control logic of FIGS. 8a–9c. The output terminals TB1–TB6 are also connected to terminals 178f–178m, respectively, of the 63 character generator circuit 178 shown in FIG. 11b. The six binary bits TB1–TB6 are capable of generating 64 different combinations from 000000 to 111111, each representing a particular character or symbol to be printed.

THE ERROR DETECTION CIRCUITRY

The validity and loading of characters is controlled by the logical circuitry of FIGS. 7a and 7b. The circuitry of FIG. 7b is comprised of a pair of J-K flip-flops 211 and 222. The output terminal of NAND gate 220 goes low when the state of the bit position TRO of serial-to-parallel converter 70 is high and when the CLKTB signal (shift pulse for buffer) is high, causing a low level to be applied to the preset input terminal 221a of flip-flop 221 whose output terminal 221e (FSTCHA) goes high. The signal level (FSTCHA) at output 221c is applied to the input 222a of J-K flip-flop 222 to cause output terminal 222d (FCCLK) to go high when the next oscillator pulse, applied to input 222b, goes negative.

The signal FCCLK is applied to one input of NOR gate 223, causing its output to go low (for a purpose to be more fully described).

The complement signal $\overline{FCCLK}$ at output 222c goes low when FCCLK goes high. $\overline{FCCLK}$ is applied to the "clear" input 221g of J-K flip-flop 221, resetting outputs 221e (FSTCHA) and 221f (FSTCHA) to low and high levels respectively.

The disabling of NOR gate 223 simultaneously places a low level on inverter 224 and NAND gate 225. The low level at the output of NAND gate 225 (NCRCLR) is applied to one input of NAND gate 241 in FIG. 7a, for a purpose to be more fully described.

The low level input applied to inverter 224 causes inverter 224 to generate a high level output, which is simultaneously applied to selected inputs of NAND gates 226 and 227.

NAND gate 226 goes high when any one (or more) of its inputs goes low. Normally, all of the inputs are high. For example, PARAENABLE (output of inverter 56 — FIG. 3) is high when the system is in the serial-to-parallel mode; the START signal which is derived from the computer output (not shown) when in the printing mode is initiated; $\overline{DCLF}$ (output of NAND gate 130 — See FIG. 9a) is high when no line feed operation is being performed; and $\overline{BELL}$ (output of NAND gate 117 — See FIG. 8e) is high when no BELL signal has been received from the computer. Thus, NAND gate 226 normally applies a low level to one input of Exclusive-OR gate 228.

NAND gate 227 likewise normally applies a low level to the other input of Exclusive-OR gate 228 since its inputs are all normally high: $\overline{BCLK}$ is high as was described hereinabove; CC8 is high when the first character has been received from the computer and is loaded into serial-to-parallel converter 70 of FIG. 6; TRO is high since the first character received from the computer contains a binary "1" in the TRO bit position; $\overline{DCLF}$ is high since no line feed operation is being performed; and $\overline{BELL}$ is high for the reason set forth hereinabove.

NAND gate 227 provides error protection in the following manner:

When TRO is not high (i.e., binary "1") and when CC8 is high then NAND gate 227 remains high. TRO should be "1" for every character (See FIG. 5*a*), hence a binary "0" indicates an errored character. When NAND gate 227 goes high at this time (to detect the error). The output of Exclusive-OR gate 228 thus goes low to prevent the generation of a clock pulse and thereby prevent the shifting of the errored character into buffer 180.

Thus, the output of Exclusive-OR gate 228 is low to disable AND gate 230.

The AND gates 229–233 each have their outputs applied to selected input terminals of five-input NOR gate 234 whose output is normally high when the outputs of AND gates 229–233 are low. The output of NOR gate 234 is inverted by inverter circuit 235 whose output is used to control other logic circuitry (to be more fully described). The output of inverter 235 is further inverted by inverter circuit 236 whose output [CLKTB(O)] is used to advance or shift data through the 132 character buffer 180.

The output of NAND gates 226 and 227 are coupled to respective inputs of an Exclusive-OR gate 228 whose output goes high when either of its inputs is high and whose output goes low when both of its inputs are either high or low. The output of Exclusive-OR gate 228 is coupled to one input of AND gate 230 whose output goes high when the output of Exclusive-OR gate 228 is high and when the output level of terminal 60*d* CC4 of counter 60 shown in FIG. 4, is low (causing $\overline{CC4}$ to go high). The output of AND gate 230 is coupled to one input of NOR gate 234 whose remaining inputs are coupled to the outputs of AND gates 229 and 231–233. The inputs of AND gate 231 are coupled to the output (PRIME) of inverter circuit 125 shown in FIG. 8*f* and the output of oscillator 50 shown in FIG. 3. Thus, the output of AND gate 231 passes oscillator pulses when the PRIME signal is high.

AND gate 232 has its input coupled to the output terminal 248*d* (DUMCHA) of one-shot 248, as shown in FIG. 7*b*. The output DUMCHA goes high when a ribbon feed (RF) signal goes high, to generate a positive going 10 millisecond pulse which feeds a dummy character (whose binary code is 011111) into the loading stage of buffer 180 and which feeds the same positive going pulse to AND gate 232.

The output of five-input NOR gate 234 goes low when any one of the following conditions exist:

1. The output of AND gate 229 goes high when DCW$\phi$ goes high (indicating the printing of a character is about to begin — this signal precedes the generation of each group of signals DCW1–DCW5) and when CIP goes high (indicating a printing mode has begun). The CIP signal also energizes the forward clutch solenoid. These signals cause the output of AND gate 229 to go high, causing the output of NOR gate 234, inverter 235 and inverter 236 to go low, high and low, respectively. The output of inverter 235 (CLKTB) is coupled to AND gate 240 of FIG. 7*a* and the output of Inverter 236 is coupled to the shift pulse inputs 180*a*-1, 180*b*-1 and 180*c*-1 of shift registers 180*a*–180*c*, respectively, to shift the loaded characters one stage to the right.

2. The output of AND gate 230 goes high when the output of Exclusive-OR gate 228 goes high and the output $\overline{CC4}$ goes high. The output of Exclusive-OR gate 228 goes high when either one of its inputs goes high (to the exclusion of the other input). NAND gate 226 goes high when any of its inputs go low. Likewise, the output of NAND gate 227 goes high when any of its inputs go low. This causes AND gate 230 to go high causing the outputs of NOR gate 234, inverter 235 and inverter 236 to go low, high and low, respectively, to operate in the same manner as was previously described with regard to Paragraph (1) set forth above.

3. The output of AND gate 231 goes high when the PRIME signal goes high which occurs when either a DELETE code is received or when a carriage-return signal (CIR) signal is received to generate a positive going pulse of 3 milliseconds duration. During this time, the PRIME signal permits the oscillator pulses to pass through AND gate 231 to cause inverter 236 to shift binary "0's" through the shift registers 180*a*–180*c* to buffer 180 so as to be assured that all stages of the buffer will be in binary "0" state prior to the receipt of the next group of characters to be loaded into the buffer. This 3 millisecond pulse permits as many as 300 clock pulses to be applied to the shift pulse inputs 180*a*-1 through 180*c*-1 of the shift registers 180*a*–180*c*, respectively (See FIG. 10*a*) to be absolutely assured of the fact that the buffer will contain binary "0's" in all of its storage positions.

4. The generation of a ribbon feed (RF) signal to the input 248*a* of one-shot multivibrator 248 causes its output 248*d* (DUMCHA) to go high, causing the output of AND gate 232 to go high. This, in turn, causes NOR gate 234, inverter 235 and inverter 236 to go low, high and low, respectively, to load the dummy character into the first or loading stage of the buffer 180.

5. The output of AND gate 233 goes high when all of its inputs are simultaneously high. Input signal $\overline{TBF}$ is high so long as the buffer 180 is not full; input ZBCR is high so long as the buffer 180 is not full and when SCLRTR (output of 247— See FIG. 7*b*) is low and when a carriage return has been called for (RCR is low — See FIG. 8*a*). When these two conditions are high, pulses from oscillator 50 cause the outputs CLKTB (0) of inverter 236 to apply the clock pulses to the shift pulse inputs of the buffer stages 180*a*–180*c* to shift information out of and thereby clear buffer 180 to receive the next line of print.

ERROR DETECTION CIRCUITRY

FIG. 7*a* shows the error detection circuitry employed to detect errors in either characters or bits of a character. The circuitry of FIG. 7*a* is comprised of NAND gate 240, whose output goes low when all three inputs are simultaneously high. This occurs when the CLKTB is high, indicating the occurrence of a shift operation (See the output of inverter 235 in FIG. 7*b*); when the $\overline{PRIME}$ is high (normal state of $\overline{PRIME}$); and when $\overline{CIP}$ is high (output 149*d*—See FIG. 9*b*), indicating that the printer head assembly is not being moved in the print direction.

When any of the three conditions (represented by the signals applied to NAND gate 240) go low, the output of NAND gate 240 goes high. This condition is NANDed with the NCRCLR signal appearing at the output of NAND gate 225 of FIG. 7*b*, to cause the output of NAND gate 241 to go low and apply a low level signal to input 242*a* of one-shot multivibrator 242. The negative edge triggers the operation of one-shot 242 to develop a positive going pulse (PARACLEAR) at output 242*d* and to develop a negative going pulse ($\overline{\text{PARACLEAR}}$) at output terminal 242*e*. Both positive and negative going pulses have a time duration of 5 microseconds. Thus, the output 242*e* is normally high. This high level is applied as one input to NAND gate 243 whose output is normally low as all of its inputs are normally high. The output of NAND gate 243 goes high when any one or more of its inputs go low.

Input $\overline{\text{ZBCR}}$ is high, having been set to this level after the buffer 180 has been fully loaded (through the application of TBF signal — See FIG. 8*a*).

The $\overline{\text{CIP}}$ signal is high during those times when no forward carriage feed operation is being performed. The $\overline{\text{PRIME}}$ signal is high so long as no delete code or carriage return signal is present. The $\overline{\text{BELL}}$ remains high so long as no bell code has been received.

The low level output of NAND gate 243 is applied as one input to AND gate 245 whose remaining input is constantly maintained at a high level. Since, under normal conditions, the output of NAND gate 243 is low, the output of AND gate 245 is low. This output is imposed upon one input of NOR gate 247 whose output generates the SCLRTR signal which is normally high and which goes low whenever it is required to clear the serial-to-parallel converter 70 of FIG. 6.

The input of Inverter circuit 244 receives the EOC signal derived from the output of NAND gate 62 shown in FIG. 4. The output of NAND gate 62 is normally high since the control counter is normally reset before it can time out. However, if an error in a transmitted bit occurs (a transmitted bit is longer than it should be), or if an end of character ("long") pulse is received, the control counter will "time out" causing the output of NAND gate 62 shown in FIG. 4 to go low. This low level is inverted by inverter circuit 244 causing its output to go high. The high output is applied as one input to AND gate 246 whose remaining input is constantly maintained at a high level. The output of AND gate 246 is applied as the second input to NOR gate 246 whose output will go low when the output of either AND gate 246 or AND gate 245 goes high. The low output of NOR gate 247 is applied to the clear input terminal 70*d* of the serial-to-parallel converter 70 shown in FIG. 6, to thereby clear the serial-to-parallel converter and prevent an invalid character from being shifted into the buffer 180.

The serial to parallel converter will thus be cleared for any one of the following conditions:

1. If the EOC signal goes low indicating that an invalid character has occurred;

2. The $\overline{\text{BELL}}$ goes low when a BELL code is received to indicate that the operator's attention is desired (usually just prior to a request for printing operation). This assures that the serial-to-parallel converter is clear and ready to receive data presented to it in serial fashion;

3. the $\overline{\text{PRIME}}$ goes low when a delete or carriage return code has been transmitted to indicate that a party at the transmitting end has detected an error in the data presented for transmission that a carriage return operation has been called for;

4. the $\overline{\text{CIP}}$ signal goes low during the printing mode to clear the contents of the serial-to-parallel converter in readiness for the receipt of data after completion of the print mode;

5. the $\overline{\text{ZBCR}}$ signal goes low when $\overline{\text{RCR}}$ or SCLRTR is high;

6. The $\overline{\text{PARACLEAR}}$ signal goes low (for 5 microseconds) upon receipt of a start signal from the transmitting end or when a shift pulse (CLKTB) ro the $\overline{\text{PRIME}}$ or the $\overline{\text{CIP}}$ signals go low to likewise clear the contents of the serial-to-parallel converter preparatory to receipt of data.

PARALLEL TRANSMISSION MODE

In the case where parallel transmission is desired, switch 55 shown in FIG. 3 is opened causing the PARAENABLE signal to go low. This signal is applied to input terminal 242*c* of one-shot multivibrator 242 shown in FIG. 7*a* to disable the multivibrator during parallel transmission of data.

FIG. 7*c* shows the ACKNOWLEDGE signal generating circuit employed during parallel transmission and is comprised of NAND gates 200 and 201 and one-shot multivibrator 202. FIG. 5*b* shows the signals employed during parallel operation and their timing relationship. The ACKNOWLEDGE signal, when high, indicates that the printer system has received a start pulse from the computer or other remote facility to thereby enable such facility to transmit data to the printer system. The ACKNOWLEDGE pulse is developed when the output of NAND gate 251 goes negatave (i.e., goes low). This occurs when both of its inputs are high. Input signal $\overline{\text{DLYLF}}$ is high (see FIG. 9*a*) except during a line feed operation. The output of NAND gate 200 is high when either the PARACLEAR signal or the $\overline{\text{BUSY}}$ signal is low. The PARACLEAR signal goes low approximately 5 microseconds after the receipt of a start pulse from the computer or other remote facility. The BUSY goes low primarily upon the termination of a print mode (see FIG. 6). The ACKNOWLEDGE signal is thus employed by the remote facility to acknowledge receipt of the last character and thereby enable transmission of the next character. ACKNOWLEDGE thus controls the rate of data flow from the remote facility to the printer system.

SYSTEM OPERATION

A description of system operation will now be given in conjunction with the detailed circuitry of FIGS. 3–11, making reference also to the simplified system block diagram of FIG. 1.

The receiver START signal from the transmitting facility (see FIG. 7*a*) causes the SCLRTR signal to clear the serial-to-parallel converter. The first character shifted into the serial-to-parallel converter 70 has the TRO bit in binary "1" state causing the dummy character to be shifted into the loading stage of the buffer 180 which has first been cleared to the transmission of a delete code (see FIG. 8*f*) to develop the PRIME signal which clears the buffer entirely preparatory to the loading in of data.

The transmission of data in the serial mode causes the $\overline{\text{DATAIN}}$ signal (see FIG. 6) to be high (this signal is derived from the data transmitting facility). This condition is inverted by Inverter 77 causing one input of NAND gate 78 to be low. The other input (PARAENABLE) is normally high during serial transmission. This causes the output of NAND gate 78 to be high. This condition is inverted by Inverter circuit 79 to maintain its output PSTR low. Serial data appears at line 11, shown in FIGS. 1 and 6, for application to the loading stage of serial-to-parallel converter 70. In the parallel mode, the $\overline{\text{DATAIN}}$ goes low and the PARAENABLE signal goes high causing the output of NAND gate 78 to go low whereby a high level input is applied to the preset enable terminal 70*c* of the serial-to-parallel converter enabling parallel data applied to input terminals 70*b*-1 through 70*b*-9 to be loaded into the serial-to-parallel converter which, in the parallel mode, operates as an additional loading stage for the buffer 180.

During serial transmission, the initiation of each bit of data causes the timing counter 54 (see FIG. 3) and the control counter 60 (see FIG. 4) to operate. These counters are automatically reset upon the termination of each data bit and initiation of the next data bit.

Control counter 60 will time out in the case where an invalid data bit is received (see EOC of FIG. 4) to cause a clear pulse SCLRTR (see FIG. 7*a*) to be generated before a shift pulse (CLKTB—see FIG. 7*b*) is generated to prevent the feeding of an invalid character to the buffer. The serial-to-parallel converter is cleared after each character is loaded therein by receipt of the "long" stop pulse causing EOC to go high and clear register 70 before receipt of the next character. Characters whose start pulse (TR0) is not a binary "1" are automatically cleared out of circuit 70 by gate 227 of FIG. 7*b* to prevent a shift pulse from being generated before the register 70 is cleared. This operation continues until the buffer is full (indicated by a TBF signal of FIG. 8*b*) at which time the printer system will go into the print mode and energize the forward clutch solenoid (see FIG. 9*b*). Alternatively, the transmitting facility may transmit a carriage return code (CR—see FIG. 8*a*) indicating that less than a full line of print is to be printed. When the carriage return code is loaded into serial-to-parallel converter 70, NAND gate 101 of FIG. 8*a* decodes this character to generate CR which causes STR2 and STR5 to go high and thereby load a carriage return code (010010) into buffer 180. When the carriage return reaches the output stage of buffer 180 NAND gate 107 (see FIG. 8*b*) detects this code to terminate printing and initiate a carriage return.

With the carriage in its left-hand most position (detected by limit switch 114 shown in FIG. 8*d*) a ready to print (RTP) signal is generated causing the printer head assembly to print the data loaded into buffer 180.

As soon as the printer carriage begins advancing, the photocell causes the generation of Strobe pulses (see FIG. 10*a*) to cause counter 166 to begin counting. The outputs of counter 166 are decoded by the NAND gates 170–175 to sequentially develop the signal DCW0 through DCW5.

The generation of signal DCW0 causes the shifting out of the dummy character from the output stage of buffer 180, thereby shifting in the first character to be printed into the output stage (see CLKTB in FIG. 7*b*). The first character is imposed upon the inputs 178*f*–178*m* of character generator 178. The signals DCW1–DCW5 are generated as the printer carriage movement past the column positions is detected by the photocell 162 to control the energization of the print solenoid drivers, which are energized in a selective manner by output terminals 178*n*–178*u*. This operation continues until limit switch 114*a* (see FIG. 8*d*) detects the fact that the printer carriage assembly has moved to its extreme right-hand position or, alternatively, until a carriage return code (RDCR—see FIG. 8*a*) appears in the output stage of the buffer 180 indicating that either a full line of print has been completed or that the printing for that line is to be completed before a full line is printed. The forward clutch drive is then deactivated and the reverse clutch driver is energized (see FIG. 9*c*).

As the printer carriage assembly is moving back to the left-hand position (i.e., performing a carriage return operation) this signal is utilized to perform a line feed operation (see FIG. 9*a*) and a ribbon feed operation.

During the printing mode NAND gate 71, shown in FIG. 6, prohibits any further data from being shifted into serial-to-parallel converter 70 by developing a low level at its output which is inverted by inverter 72 causing a high level to appear at the input of Inverter 73 and thereby preventing any data from entering into the serial to parallel converter 70.

The BELL signal (see FIG. 8*e*) is generated when it is desired to obtain the operator's attention by transmitting a BELL code. In the case where the operator at the transmitting facility is inserting data into a keyboard at the transmitting facility (not shown) and detects the fact that he has made an error, a delete code will be transmitted to prohibit the printer system from printing the line of print which includes the error. This circuitry is shown in FIG. 8*f* which causes the PRIME signal to be generated upon the occurrence of a DELETE code or, alternatively, upon the occurrence of every carriage return operation (CIR—see FIG. 9*c*). The PRIME signal has a duration of 3 milliseconds which is sufficient in length to pass oscillator pulses through the AND gate 231 shown in FIG. 7*b* to clear the buffer of its contents prior to the loading of the data representing the next line of print.

In the case where a line feed of a number of lines is to occur before the next line of characters is printed, a line feed code may be transmitted. This is decoded by the circuitry shown in FIG. 9*a* to cause as many line feed operations as is desired before printing the next line of print.

The ZBCR signal generated by the circuitry of FIG. 8*a* causes the circuitry of FIG. 7*b* to clear the buffer upon the receipt of a carriage return code decoded by NAND gate 101 of FIG. 8*a*. This operation will also occur when an error has been detected in the data bits being fed to the serial-to-parallel converter causing any data shifted into the buffer 180 to be cleared.

It can be seen from the foregoing description that the present invention provides a novel high-speed printer of the dot matrix type in which data received in a serial mode is first examined for accuracy and then shifted into a buffer once the data bits are shown to be valid. The printing operation does not occur until data representative of a full line of print is loaded into the buffer at which time the printer continuously moves at high speed during the printing of a line, thereby significantly increasing the speed of operation. Instead of attempting to accurately control the speed of movement of the printer head assembly, the printer head assembly is free to move at a rate determined by the printer drive motor and the position of the printer head carriage assembly is accurately detected to exert highly accurate control over the moment at which the printer solenoids are actuated. The system is capable of accepting data in either serial or parallel form and is capable of printing either full lines of partial lines spaced to any amount desired by the transmitting facility. In one preferred embodiment, the system is capable of printing characters at the rate of 165 per second printing lines at the rate of 60 lines per minute up to 150 lines per minute (for short lines) and is capable of accepting information at a transmission rate of 3,000 bits per second per serial transmission and 80,000 characters per second during parallel transmission and is further capable of printing 63 different characters or symbols at the above rate. The buffer is also completely cleared during the time at which the carriage return operation is being performed as is automatically determined by the end of print limit switch or as may be controlled by receipt of a delete code or a carriage return code to assure the fact that the buffer is thereafter free to receive new data preparatory to the printing of each line.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A serial to parallel converter for converting incoming binary data signals presentqd in serial fashion into parallel data for loading into a multistage buffer wherein all bits are of equal time duration, and wherein binary states of the bits all undergo the same abrupt signal level transition upon their initiation and wherein a first portion of a bit of a first binary state is greater in length than the first portion of a bit of the opposite binary state comprising:
- an input line for receiving serially transmitted data signals;
- a multistage shift register having an input directly coupled to said input line for receiving and temporarily storing a group of bits;
- timing means including a counter coupled to said input line for beginning a count upon the initiation of each and every bit;
- means coupled to said timing means for initiating the loading of each bit into said register;
- said loading initiating means comprising means for generating a loading pulse when said timing means achieves a predetermined count, said count occurring after the first portion of a bit of said opposite state and before the first portion of a bit of said first binary state;
- said register including means responsive to said loading pulse for inserting the binary state of the bit in the input line at such time into said register.

2. The converter of claim 1 further comprising buffer means for receiving the parallel output of said register;
- said bits being transmitted in groups to represent a particular character, each of said groups being followed by a constant level stop pulse of a duration greater than said bits;
- means coupled between said timing means and said input line for resetting said timing means upon the initiation of each bit in said input line;
- means coupled to said timing means for generating a clear signal when said timing means generates a second predetermined count which is greater than said first predetermined count;
- said register including clearing means responsive to said clear signal generating means for clearing the contents of said register in the presence of a clear signal.

3. The converter of claim 2 further comprising shift means for shifting the contents of said converter into said buffer;
- each of said groups of bits being preceded by a start signal of a predetermined binary state;
- means being coupled between said shift means and the stage of said register containing said start signal for energizing said shift means.

4. The circuitry of claim 1 further comprising second timing means coupled to said input line being initiated by the start of each bit to generate a second timing signal a predetermined time period longer than the interval of a bit, said second timing means adapted to be reset upon the initiation of each newly received bit to begin a new cycle before generating said second timing signal;
- means coupled to said second timing means to clear said register means only upon receipt of a second timing signal.

5. The circuitry of claim 4 wherein said clearing means further comprises means coupled to the last stage of the first register means and said second timing means for clearing said first register means when a bit has not been shifted to said last stage at the time that said second timing signal is generated.

6. The circuit of claim 5 further comprising second register means having its inputs coupled in parallel to the outputs of said first register means;
- said clearing means being coupled to said second register means to enable the contents of said first register means to be transferred in parallel fashion to said second register means only when a bit has been shifted into the last stage of said first register means and said second timing signal is generated.

* * * * *